(12) United States Patent
Murison

(10) Patent No.: US 10,206,849 B2
(45) Date of Patent: Feb. 19, 2019

(54) METHODS AND DEVICES RELATING TO MOLDED ADULT DEVICES

(71) Applicant: Obotics Inc., North Gower (CA)

(72) Inventor: Bruce Murison, North Gower (CA)

(73) Assignee: Obotics Inc., North Gower (CA)

( * ) Notice: Subject to any disclaimer, the term of this patent is extended or adjusted under 35 U.S.C. 154(b) by 589 days.

(21) Appl. No.: 14/796,077

(22) Filed: Jul. 10, 2015

(65) Prior Publication Data
US 2016/0008218 A1    Jan. 14, 2016

Related U.S. Application Data

(60) Provisional application No. 62/022,713, filed on Jul. 10, 2014.

(51) Int. Cl.
| | |
|---|---|
| *A61H 23/00* | (2006.01) |
| *A61H 19/00* | (2006.01) |
| *A61H 23/02* | (2006.01) |
| *B29L 31/00* | (2006.01) |
| *B29C 49/04* | (2006.01) |
| *B29C 49/06* | (2006.01) |

(52) U.S. Cl.
CPC ............. *A61H 23/00* (2013.01); *A61H 19/32* (2013.01); *A61H 19/34* (2013.01); *A61H 19/40* (2013.01); *A61H 19/44* (2013.01); *A61H 23/0263* (2013.01); *A61H 2201/0153* (2013.01); *A61H 2201/0207* (2013.01); *A61H 2201/0214* (2013.01); *A61H 2201/0257* (2013.01); *A61H 2201/10* (2013.01); *A61H 2201/1253* (2013.01); *A61H 2201/5012* (2013.01); *A61H 2201/5097* (2013.01); *B29C 49/04* (2013.01); *B29C 49/06* (2013.01); *B29L 2031/7158* (2013.01)

(58) Field of Classification Search
CPC ........ A61H 19/34; A61H 19/40; A61H 19/44; A61H 2201/0153
See application file for complete search history.

(56) References Cited

U.S. PATENT DOCUMENTS

| | | |
|---|---|---|
| 4,722,327 A | 2/1988 | Harvey |
| 4,790,296 A | 12/1988 | Segal |
| | (Continued) | |

OTHER PUBLICATIONS

Chapman, Jr., "An Unusual Intravaginal Foreign Body", Journal of the National Medical Association, 1984, pp. 811-812, vol. 76, No. 8, USA.

(Continued)

*Primary Examiner* — Christine H Matthews
(74) *Attorney, Agent, or Firm* — Rosenberg, Klein & Lee

(57) ABSTRACT

Adult devices for sexual and therapeutic purposes are typically developed and marketed into a limited number of developed countries with high disposable incomes. However, these represent a fraction of the total potential adult population and accordingly it would be beneficial in all of these markets to offer low cost, ideally very low cost, but effective devices. Solutions meeting this very low cost manufacturing requirement as well as offering new concepts such as limited use or disposable devices are presented exploiting blow molding techniques. Further, many potential markets present issues not prevalent in historical markets that may make it difficult for individuals to acquire devices, even without the financial issues, and hence solutions are presented wherein adult devices can be acquired and/or marketed in manners that address or mitigate these issues.

18 Claims, 23 Drawing Sheets

(56) References Cited

U.S. PATENT DOCUMENTS

| | | | |
|---|---|---|---|
| 5,076,261 | A | 12/1991 | Black |
| 5,501,650 | A | 3/1996 | Gellert |
| 5,573,499 | A | 11/1996 | McAllister |
| 5,690,603 | A | 11/1997 | Kain |
| 5,690,604 | A | 11/1997 | Barnett |
| 5,725,473 | A | 3/1998 | Taylor |
| 5,851,175 | A | 12/1998 | Nickell |
| 5,853,362 | A | 12/1998 | Jacobs |
| 6,142,929 | A | 11/2000 | Padgett |
| 6,203,491 | B1 | 3/2001 | Uribe |
| 6,436,029 | B1 | 8/2002 | Benderev |
| 6,533,718 | B1 | 3/2003 | Ritchie et al. |
| 6,599,236 | B1 | 7/2003 | Castro |
| 6,866,645 | B2 | 3/2005 | Lee |
| 6,899,671 | B1 | 5/2005 | Fontenot |
| 6,902,525 | B1 | 6/2005 | Jewell |
| 6,991,599 | B2 | 1/2006 | Hudson |
| 6,997,888 | B2 | 2/2006 | Rehrig |
| 7,108,668 | B2 | 9/2006 | Fang |
| 7,166,072 | B2 | 1/2007 | Smith |
| 7,452,326 | B2 | 6/2008 | Fladl |
| 7,438,681 | B2 | 10/2008 | Kobashikawa |
| 7,513,868 | B1 | 4/2009 | Fontenot |
| 7,524,283 | B1 | 4/2009 | Johnstone |
| 7,530,944 | B1 | 5/2009 | Kain |
| 7,604,587 | B2 | 10/2009 | Manska |
| D605,779 | S | 12/2009 | Murison |
| 7,670,280 | B2 | 3/2010 | Gloth |
| 7,871,386 | B2 | 1/2011 | Nan |
| 7,931,605 | B2 | 4/2011 | Murison |
| 7,967,740 | B2 | 6/2011 | Mertens |
| D652,942 | S | 1/2012 | Murison |
| 8,109,869 | B2 | 2/2012 | Beaulieu |
| 2002/0103415 | A1 | 8/2002 | Manska |
| 2003/0195441 | A1 | 10/2003 | Firouzgar |
| 2004/0082831 | A1 | 4/2004 | Kobashikawa |
| 2004/0147858 | A1 | 7/2004 | Lee |
| 2005/0033112 | A1 | 2/2005 | Bruton |
| 2006/0074273 | A1 | 4/2006 | Smith |
| 2006/0106327 | A1 | 5/2006 | Thielen |
| 2006/0247493 | A1 | 11/2006 | Chen |
| 2007/0055096 | A1 | 3/2007 | Berry |
| 2007/0232967 | A1 | 10/2007 | Driscoll |
| 2007/0244418 | A1 | 10/2007 | Harkness |
| 2008/0071138 | A1 | 3/2008 | Mertens |
| 2008/0082028 | A1 | 4/2008 | Blevins |
| 2008/0119767 | A1 | 5/2008 | Berry |
| 2008/0139980 | A1 | 6/2008 | Fladl |
| 2009/0005635 | A1 | 1/2009 | Zhang et al. |
| 2009/0318755 | A1 | 12/2009 | Adams |
| 2010/0087703 | A1 | 4/2010 | Gabrielidis |
| 2010/0204542 | A1 | 8/2010 | Hodge |
| 2010/0292531 | A1 | 11/2010 | Beaulieu |
| 2011/0009693 | A1 | 1/2011 | Borrero |
| 2011/0021870 | A1 | 1/2011 | Lee |
| 2011/0034837 | A1 | 2/2011 | Lee |
| 2011/0082332 | A1 | 4/2011 | Lee |
| 2011/0082333 | A1 | 4/2011 | Wilson et al. |
| 2011/0105837 | A1 | 5/2011 | Lee |
| 2011/0124959 | A1 | 5/2011 | Murison |
| 2011/0166415 | A1 | 7/2011 | Zamar |
| 2011/0218395 | A1 | 9/2011 | Stout |
| 2011/0319707 | A1 | 12/2011 | Mertens |
| 2012/0118296 | A1 | 5/2012 | Oeltjen |
| 2012/0123199 | A1 | 5/2012 | Topolev |
| 2012/0136205 | A1 | 5/2012 | Aguilera Galeote |
| 2012/0143001 | A1 | 6/2012 | Case |
| 2012/0179077 | A1 | 7/2012 | Tuck |
| 2012/0184884 | A1 | 7/2012 | Dyer |
| 2012/0197072 | A1 | 8/2012 | Cordle |

OTHER PUBLICATIONS

Akhtar et al., "Case of Unusual Foreign Body in the Rectum", Saudi Journal of Gastroenterology, Apr. 2009, pp. 131-132, vol. 15, No. 2, Riyadh, Saudi Arabia.

Huang et al., "Retained Rectal Foreign Bodies", Journal of the Chinese Medical Association, Oct. 2003, pp. 607-612, vol. 66, No. 10, Taipei, Taiwan.

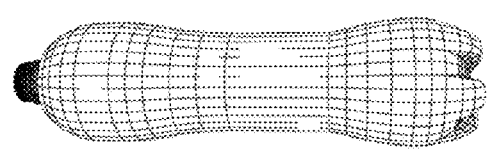
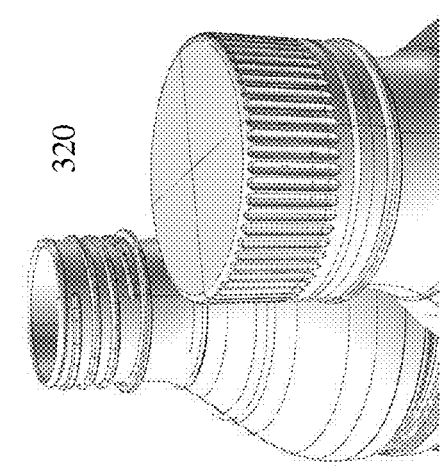
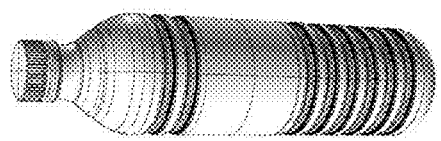
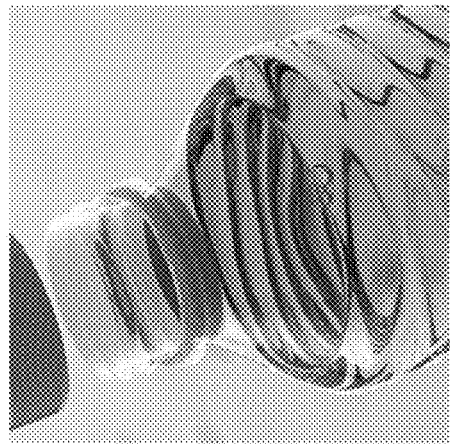
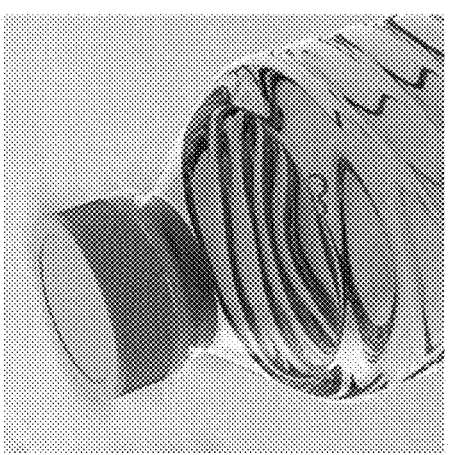
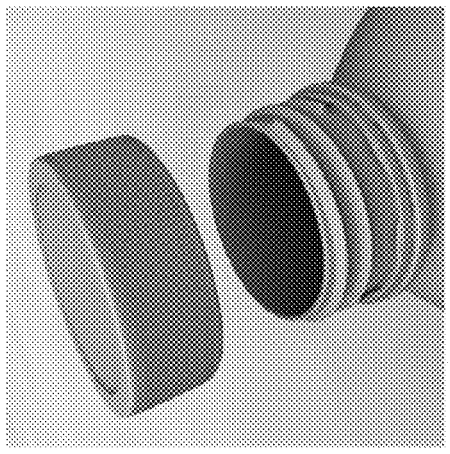
Figure 3

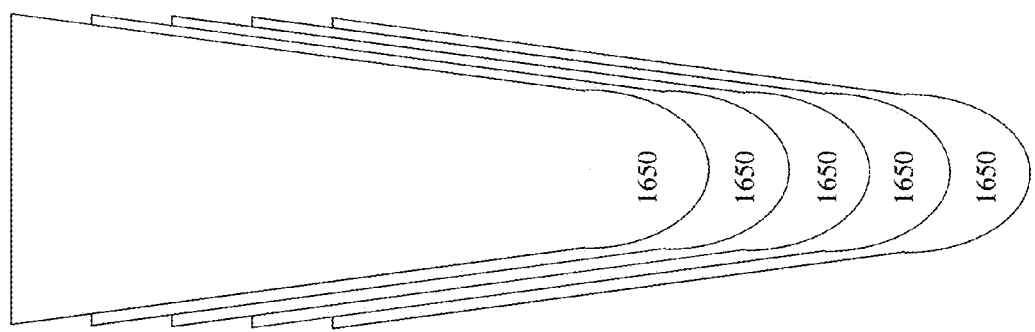
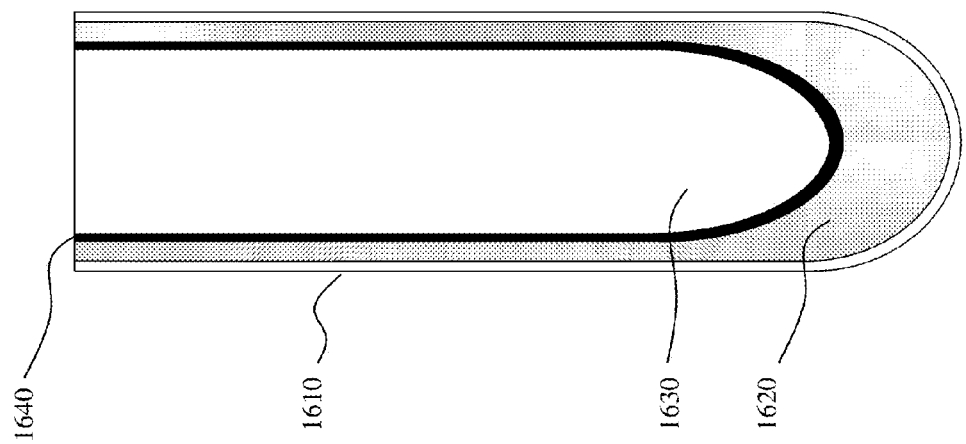
Figure 16

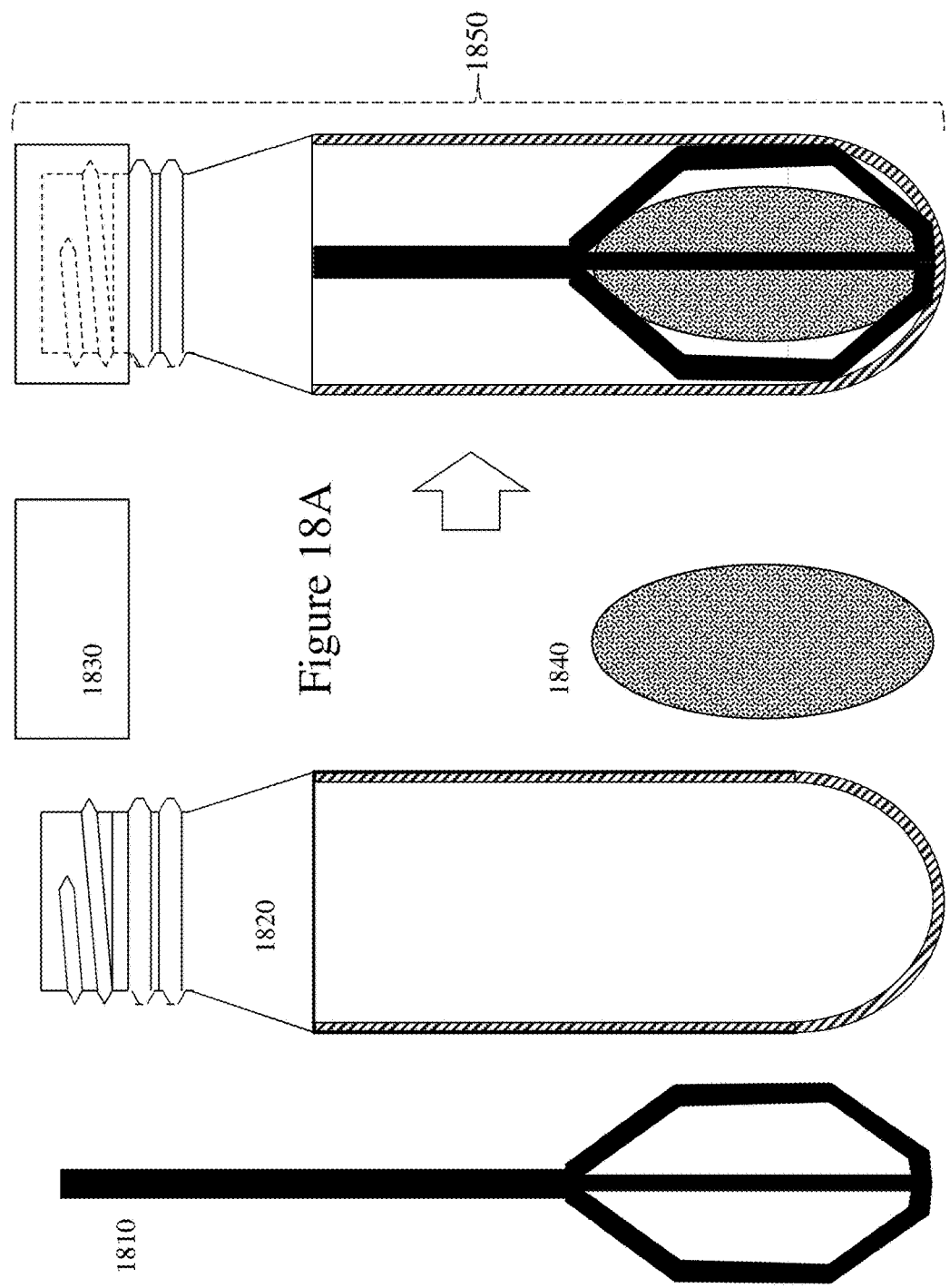

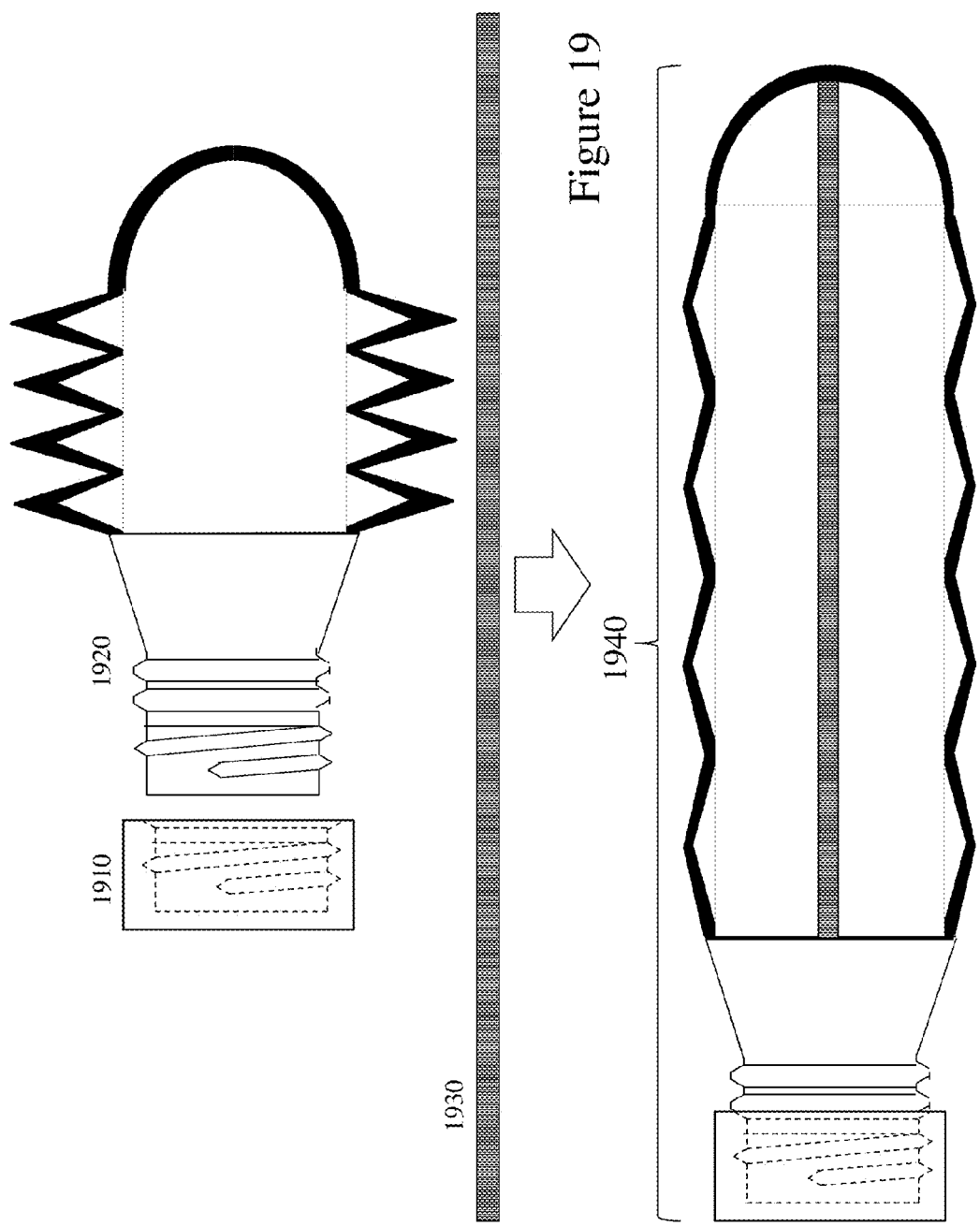

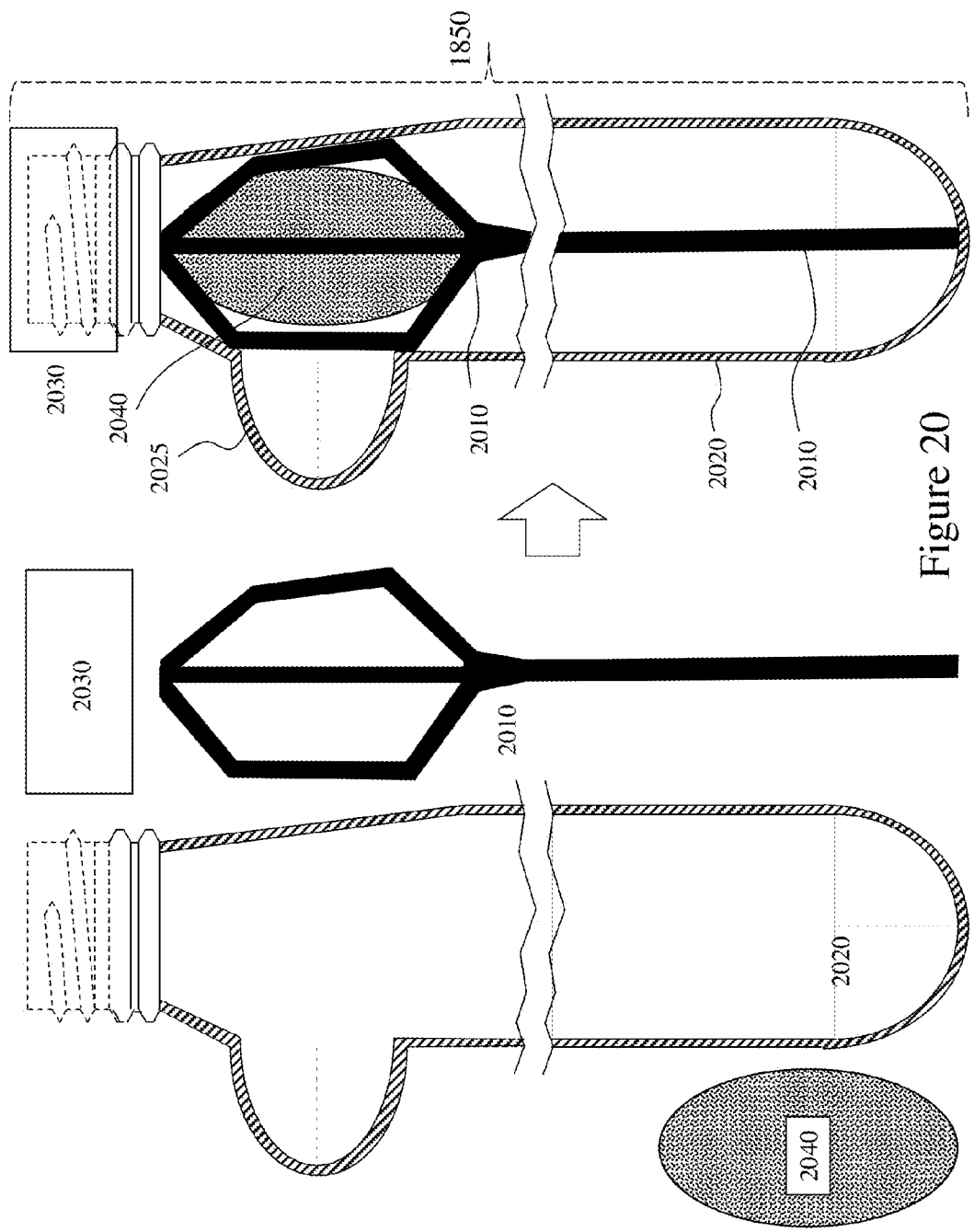

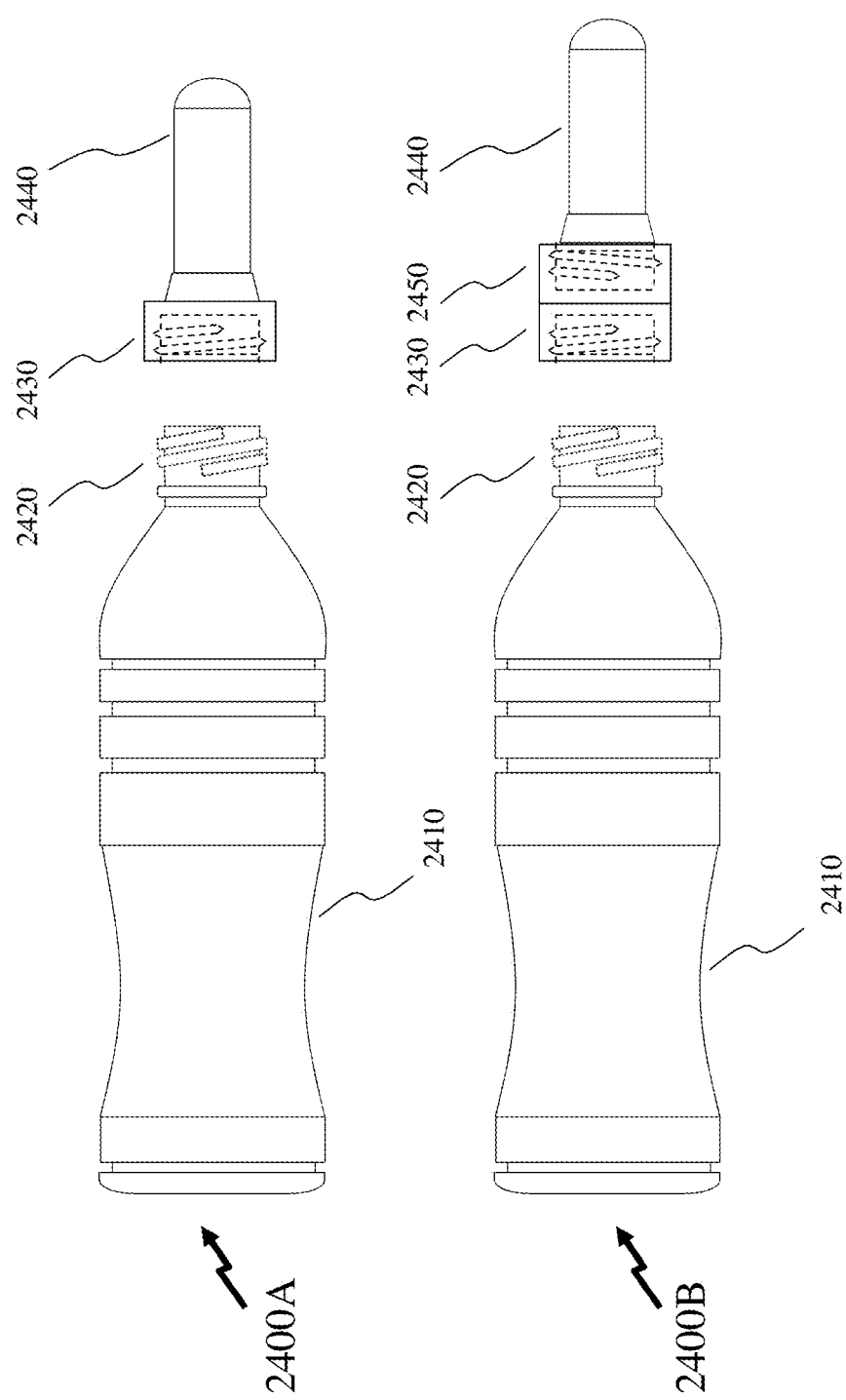

METHODS AND DEVICES RELATING TO MOLDED ADULT DEVICES

CROSS-REFERENCE TO RELATED APPLICATIONS

This patent application claims the benefit of U.S. Provisional Patent Application 62/022,713 filed on Jul. 10, 2014 entitled "Methods and Devices Relating to Molded Adult Devices," the entire contents of which are included herein by reference.

FIELD OF THE INVENTION

The present invention relates to devices for sexual pleasure and more particularly to low cost and/or disposable devices exploiting blow molding, injection molding, or a combination thereof in conjunction with active and/or elements providing functions such as vibration, rigidity, movement, sensing, user sensations, communications, control and power.

BACKGROUND OF THE INVENTION

The sexual revolution, also known as a time of "sexual liberation", was a social movement that challenged traditional codes of behavior related to sexuality and interpersonal relationships throughout the Western world from the 1890s to the 1980s. However, its roots may be traced back further to the Enlightenment and the Victorian era in the Western world and even further in the Eastern world. Sexual liberation included increased acceptance of sex outside of traditional heterosexual, monogamous relationships (primarily marriage) as well as contraception and the pill, public nudity, the normalization of homosexuality and alternative forms of sexuality, and the legalization of abortion.

At the same time the growing acceptance of sexuality and masturbation resulted in the growth of a market for sexual devices, also known as sex toys, and then with technology evolution the concepts of "cyber-sex," "phone sex" and "webcam sex." A sex toy is an object or device that is primarily used to facilitate human sexual pleasure and typically is designed to resemble human genitals and may be vibrating or non-vibrating. Prior to this shift there had been a plethora of devices sold for sexual pleasure, although primarily under euphemistic names and a pretense of providing "massage" although their history extends back through ancient Greece to the Upper Paleolithic period before 30,000 BC. Modern devices fall broadly into two classes: mechanized and non-mechanized, and in fact the American company Hamilton Beach in 1902 patented the first electric vibrator available for retail sale, making the vibrator the fifth domestic appliance to be electrified. Mechanized devices typically vibrate, although there are examples that rotate, thrust, and even circulate small beads within an elastomeric shell. Non-mechanized devices are made from a solid mass of rigid or semi-rigid material in a variety of shapes.

Examples of such non-mechanized devices which require their motion to be induced either by the individual user themselves or a partner within the prior art include U.S. Pat. Nos. 5,853,362; 5,690,603; 5,853,362; 6,436,029; 6,599,236; 6,533,718; 6,997,888; 7,513,868; 7,530,944 as well as U.S. Patent Applications 2003/0,023,139; 2005/0,228,218; 2007/0,106,109; 2010/0,087,703; 2010/0,204,542; 2011/0,021,870; 2012/0,123,199; 2012/0,136,205 and 2012/0,143,001. Other associated prior art relates to how such devices may be "worn" by a partner either with or without the need of straps or belts or used by an individual including U.S. Pat. Nos. 5,725,473; 6,203,491; and 6,991,599 as well as U.S. Patent Applications 2010/0,087,703; 2011/0,082,333; and 2012/0,118,296.

Not surprisingly many early mechanized devices within the prior art were primarily intended to automate the motion of penetrative intercourse. Such prior art includes for example U.S. Pat. Nos. 4,722,327; 4,790,296; 5,076,261; 5,690,604; 5,851,175; 6,142,929; 6,866,645; 6,899,671; 6,902,525; 7,524,283 and U.S. Patent Application 2004/0,147,858. In contrast to these mechanized devices producing repeated penetrative action, vibrators are used to excite the nerve endings in the pelvic region, amongst others, of the user such as those same regions of the vagina that respond to touch. For many users the level of stimulation that a vibrator provides is inimitable. They can be used for masturbation or as part of sexual activities with a partner. Vibrators may be used upon the clitoris, inside the vagina, inserted into the rectum, and against nipples either discretely or in some instances in combination through multiple vibratory elements within the same vibrator or through using multiple vibrators.

Vibrators typically operate through the operation of an electric motor wherein a small weight attached off-axis to the motor results in vibration of the motor and hence the body of the portion of the vibrator coupled to the electric motor. They may be powered from connection to an electrical mains socket but typically such vibrators are battery driven which places emphasis on efficiency to derive not only an effective vibration but one over an extended period of time without the user feeling that the vibrator consumes batteries at a high rate. For example, typical vibrators employ 2 or 4 AA batteries, which if of alkaline construction, each have a nominal voltage of 1.5V and a capacity of 1800 mAh to 2600 mAh under 500 mA drain. As such, each battery under such a nominal drain can provide 0.75 W of power for 3 to 5 hours such that a vibrator with 2 AA batteries providing such lifetime of use must consume only 1.5 W in contrast to less than 3 W for one with 4 AA batteries. More batteries consume more space within devices which are generally within a relatively narrow range of physical sizes approximating that of the average penis in penetrative length and have an external portion easily gripped by the user thereby complicating the design. Typically, toys that are large due to power requirements are not as successful as more compact toys.

Example of such vibrators within the prior art include U.S. Pat. Nos. 5,573,499; 6,902,525; 7,108,668; 7,166,072; 7,438,681; 7,452,326; 7,604,587; 7,871,386; 7,967,740 and U.S. Patent Applications 2002/0,103,415; 2003/0,195,441 (Wireless); 2004/0,082,831; 2005/0,033,112; 2006/0,074,273; 2006/0,106,327; 2006/0,247,493; 2007/0,055,096; 2007/0,232,967; 2007/0,244,418; 2008/0,071,138; 2008/0,082,028; 2008/0,119,767; 2008/0,139,980; 2009/0,093,673; 2008/0,228,114; 2009/0,099,413; 2009/0,105,528; 2009/0,318,753; 2009/0,318,755; 2010/0,292,531; 2011/0,009,693; 2011/0,034,837; 2011/0,082,332; 2011/0,105,837; 2011/0,166,415; 2011/0,218,395; 2011/0,319,707; 2012/0,179,077; 2012/0,184,884; and 2012/0,197,072.

Within these prior art embodiments of vibrators different approaches have been described to provide different stimulation mechanisms other than simple vibration. Some of these, such as rotating rows or arrays of balls, typically metal, have been commercially successful. However, others have not been commercially successful to date including, for example, the use of linear screw drive mechanisms to provide devices that adjust in length. Another common approach has been to include a rotary motor with a profiled metal rod to either impact the device's outer body or provide rotary motion of the device head.

The prior art devices described above exploit mechanical actions arising from linear and/or rotary motors in order to achieve the desired physical stimulation. However, motion and pressure may be achieved also through the use of fluidics wherein a fluid is employed such that controlling the pressure of the fluid results in the movement of an element within a structure or the expansion/contraction of an element. Some sex toys exploiting fluidics have provisioned for lubricating oils or gels during use of the device to reduce friction and subsequent pain/irritation either through extended use of the device or from low natural lubrication of the user upon whom the device is used.

It would be evident from consideration of the prior art devices described above that these devices are primarily driven to stimulation of the female clitoris, vagina and rectum as well as the male rectum. Whilst vibrators such as described supra may be used for stimulating the male penis, and in some instances such as the "Cobra Libre" vibrator designed specifically for attachment to the penis there has been relatively little prior art and development towards stimulating the male penis through simulation of intercourse above and beyond manual devices. One exception being Gellert in U.S. Pat. No. 5,501,650 that provides a variable speed motor powering a crankshaft driven sealed assembly producing pneumatically induced reciprocating motion against the penis when inserted.

Accordingly, today, a wide range of vibrators are offered commercially to users but most of them fall into several broad categories including:

Clitoral: The clitoral vibrator is a sex toy used to provide sexual pleasure and to enhance orgasm by stimulating the clitoris. Although most of the vibrators available can be used as clitoral vibrators, those designed specifically as clitoral vibrators typically have special designs that do not resemble a vibrator and are generally not phallic shaped. For example, the most common type of clitoral vibrators are small, egg-shaped devices attached to a multi-speed battery pack by a cord. Common variations on the basic design include narrower, bullet-shaped vibrators and those resembling an animal. In other instances, the clitoral vibrator forms part of a vibrator with a second portion to be inserted into the vagina wherein they often have a small animal, such as a rabbit, bear, or dolphin perched near the base of the penetrative vibrator and facing forward to provide clitoral stimulation at the same time with vaginal stimulation. Prior art for clitoral stimulators includes U.S. Pat. Nos. 7,670,280 and 8,109,869 as well as U.S. Patent Application 2011/0,124,959.

In some instances, such as the We-Vibe™, the clitoral vibrator forms part of a vibrator wherein another section is designed to contact the "G-spot." Prior art for such combined vibrators includes U.S. Pat. No. 7,931,605, U.S. Design Pat. Nos. 605,779 and 652,942, and U.S. Patent Application 2011/0,124,959.

Dildo-Shaped: Typically these devices are approximately penis-shaped and can be made of plastic, silicone, rubber, vinyl, or latex. Dildo is the common name used to define a phallus-like sex toy, which does not, however, provide any type of vibrations. But as vibrators have commonly the shape of a penis, there are many models and designs of vibrating dildos available including those designed for both individual usage, with a partner, for vaginal and anal penetration as well as for oral penetration, and some may be double-ended.

Rabbit: As described above these comprise two vibrators of different sizes. One, a phallus-like shaped vibrator intended to be inserted in the user's vagina, and a second smaller clitoral stimulator placed to engage the clitoris when the first is inserted. The rabbit vibrator was named after the shape of the clitoral stimulator, which resembles a pair of rabbit ears.

G-Spot: These devices are generally curved, often with a soft jelly-like coating intended to make it easier using it to stimulate the g-spot or prostate. These vibrators are typically more curved towards the tip and made of materials such as silicone or acrylic.

Egg: Generally small smooth vibrators designed to be used for stimulation of the clitoris or insertion. They are considered discreet sex toys as they do not measure more than 3 inches in length and approximately ¾ inches to 1¼ inches in width allowing them to be used discretely, essentially at any time.

Anal: Vibrators designed for anal use typically have either a flared base or a long handle to grip, to prevent them from slipping inside and becoming lodged in the rectum. Anal vibrators come in different shapes but they are commonly called butt plugs or phallus-like vibrators. They are recommended to be used with a significant amount of lubricant and to be inserted gently and carefully to prevent any potential damage to the rectal lining.

Vibrating Cock Ring: Typically a vibrator inserted in or attached to a cock ring primarily intended to enhance clitoral stimulation during sexual intercourse.

Pocket Rocket (also known as Bullet): Generally cylindrical in shape one of its ends has some vibrating bulges and is primarily intended to stimulate the clitoris or nipples, and not for insertion. Typically, a "pocket rocket" is a mini-vibrator that is typically about three to five inches long and which resembles a small, travel-sized flashlight providing for a discreet sex toy that can be carried around in a purse, pouch, etc. of the user. Due to its small dimension, it is typically powered by a single battery and usually has limited controls; some may have only one speed.

Butterfly: Generally describing a vibrator with straps for the legs and waist allowing for hands-free clitoral stimulation during sexual intercourse. Typically, these are offered in three variations, traditional, remote control, and with anal and/or vaginal stimulators, and are generally made of flexible materials such as silicone, soft plastic, latex, or jelly.

In addition to the above general categories there are variants including, but not limited to:

Dual vibrators which are designed to stimulate two erogenous zones simultaneously or independently, the most common being both clitoral and vaginal stimulators within the same vibrator;

Triple vibrators which are designed to stimulate three erogenous zones simultaneously or independently;

Multispeed vibrators which allow users to adjust how fast the vibrator's pulsing or massaging movements occur and generally provide a series of discrete speed settings selectable through a button, slider etc. or pseudo-continuously variable through a rotary control;

Double ended devices for use by two users together, usually doubled ended dildo or double ended vibrator, for vaginal-vaginal, vaginal-anal, or anal-anal stimulation;

Nipple stimulators which are designed to stimulate the nipples and/or areola through vibration, suction, and clamping;

Electrostimulators which are designed to apply electrical stimulation to the nerves of the body, with particular emphasis on the genitals;

"Flapping" stimulators which have multiple flexible projections upon a "Ferris-wheel" assembly to simulate oral stimulation; and Male stimulators which are typically soft silicone sleeves to surround the penis and stimulate it through rhythmic movement by the user.

Naturally, there are other common forms including, but not limited to, so-called "alarm clock vibrators" wherein a vibrator is combined with a clock or a timer and worn in or against the genitals such that the user is woken with a gentle vibration and then with increasing power. "Undercover" vibrators are discreetly shaped as everyday objects, such as lipstick tubes, cell phones, or art pieces and typically only one speed and are powered by a single battery. By virtue of being an exact copy of the shape and design of the object they are intended to be mistaken for as they are very discreet for users.

The prior art devices described above are primarily sold/marketed as fully assembled and functional products to consumers at a range of prices from tens of dollars to hundreds of dollars with the intention that the user owns and uses the product over an extended period of time having invested financially into the product. However, such products are essentially caught with a self-fulfilling design and product cycle. The devices are either designed to be passive, such as dildos, plugs, etc. wherein the design/marketing focus is to increased length, girth, etc. and simulating realistic human skin textures/colours etc., or be active, such as vibrators, wherein the design/marketing focus also includes increased functions, range of controls, etc. Accordingly, the current market/design focus is based upon the premise that most consumers purchasing such adult devices will do so rarely and accordingly it is important to essentially exploit an "up-selling" approach of getting the consumer to purchase a product at a price point in excess of that they initially intended to purchase at. Accordingly, devices today are manufactured from a range of materials including, but not limited to, hard plastics for internal battery housings, outer shell, etc. and silicones for external surfaces or the body of the adult device.

However, there are many instances that a consumer may wish to purchase a lower cost adult device either as a result of circumstances or personal preferences. In other instances the consumer may wish to have a disposable adult device or an adult device that does not look like an adult device. Even today, despite the financial value of the adult device market, the volumes of these adult devices are relatively low and have typically been marketed into markets such as Europe, North America, Japan, Australia etc. where disposable incomes support purchasing adult devices at the pricing points in existence today. However, these markets represent approximately 1.5 billion people out of a global population of over 7 billion and even here a large portion of the population cannot afford these devices. Accordingly, it would be beneficial in all of these markets to offer low cost, ideally very low cost, but effective devices.

Further, in many regions of the world potential markets are not accessible today due to a range of issues including cultural barriers, making it difficult for individuals to acquire devices, as well as financially where even current entry level devices can cost individuals many weeks and/or months disposable income in these markets. Accordingly, it would beneficial in these markets that not only are devices offered at low cost, ideally very low cost, whilst being effective that they can be acquired and/or marketed in manners that address cultural issues etc.

Accordingly, it would be beneficial to exploit manufacturing techniques, such as blow molding techniques, to allow a range of adult devices to be manufactured at costs that support the above competing requirements and offer manufacturing volumes addressing volumes unknown previously within the adult device industry.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to devices for sexual pleasure and more particularly to low cost and/or disposable devices exploiting blow molding, injection molding, or a combination thereof in conjunction with active and/or elements providing functions such as vibration, rigidity, movement, sensing, user sensations, communications, control and power.

In accordance with an embodiment of the invention there is provided a device comprising a blow molded outer body enclosing a predetermined region with an opening wherein the opening allows the predetermined region to be filled with a fluid and sealed.

In accordance with an embodiment of the invention there is provided a sex toy comprising a blow molded outer body enclosing a predetermined region with an opening wherein the opening allows the predetermined region to be filled at least one of filled with a fluid and sealed, left empty and sealed, and left empty and not sealed.

In accordance with an embodiment of the invention there is provided a device comprising a blow molded outer body enclosing a predetermined region with an opening wherein the opening allows the insertion of a stimulation module at least one of prior to and after a user obtains the blow molded outer body.

In accordance with an embodiment of the invention there is provided a sex toy comprising an outer body and a plurality of active elements for insertion into the outer body wherein each active element providing a predetermined function selected from the group comprising a physical effect, a stimulation, a controller, a power source, and communications interface and the user may select varying combinations of the plurality of active elements with each use of the sex toy.

In accordance with an embodiment of the invention there is provided a device comprising a blow molded outer body enclosing a predetermined region with a threaded opening wherein the threaded opening allows the predetermined region to be filled with a fluid and sealed, wherein the threaded opening is dimensioned to allow the insertion of a vibrator element and a cap for sealing the device comprising a portion extending into the device to hold the vibrator element at the distal end from the threaded opening.

In accordance with an embodiment of the invention there is provided a device comprising a blow molded outer body enclosing a predetermined region with an opening of predetermined geometry, wherein the opening allows the predetermined region to be filled with a fluid and sealed and is dimensioned to allow the insertion of an active element providing a physical effect and the attachment of a sealing element for sealing the device which comprises a portion extending into the device to hold the active element.

In accordance with an embodiment of the invention there is provided a device comprising a blow molded outer body enclosing a predetermined region with a threaded opening wherein the threaded opening allows the predetermined region to be filled with a fluid and sealed such that the device can be used to penetrate an orifice of a user, wherein the threaded opening is dimensioned to allow the insertion of a vibrator element having a threaded portion for sealing the device once the vibrator element is inserted into the threaded opening.

In accordance with an embodiment of the invention there is provided a device comprising a blow molded outer body enclosing a predetermined region with an opening of predetermined geometry wherein the opening allows the predetermined region to be filled with a fluid and sealed such that the device can be used to stimulate a region of a human body, wherein the opening is dimensioned to allow the insertion of an active element having a portion for sealing the device once the active element is inserted into the opening.

In accordance with an embodiment of the invention there is provided a device comprising a blow molded outer body enclosing a predetermined region with an opening wherein the opening allows the predetermined region to be filled with a foam and sealed, wherein the opening is dimensioned to allow the insertion of a vibrator element at least one of prior to and after filling the device with foam.

In accordance with an embodiment of the invention there is provided a device comprising a blow molded outer body enclosing a predetermined region with an opening wherein the opening allows a first predetermined region to be filled with a foam and a second predetermined region to be unfilled with the foam and the opening is dimensioned to allow the insertion of a vibrator element and for sealing the device once the vibrator element is inserted into the opening and the second predetermined region is dimensioned to fit the vibrator element.

In accordance with an embodiment of the invention there is provided a device comprising a blow molded outer body enclosing a predetermined region with an opening wherein the opening allows the predetermined region to be filled with a fluid and sealed such that the device can be used to penetrate an orifice of a user, wherein the device is initially sold with at least one of a snap-fit cap and a threaded cap sealing the device.

In accordance with an embodiment of the invention there is provided a device comprising a first predetermined portion to provide a vibratory function and a second predetermined portion comprising at least a threaded region mating to a predetermined thread.

In accordance with an embodiment of the invention there is provided a method comprising providing a device comprising at least a blow molded outer body filled with a filler enclosing a first predetermined region and a threaded opening wherein the threaded opening allows the insertion of a vibrator element having a threaded portion for mounting the vibrator element to the blow molded outer body, wherein the vibrator element is inserted into the blow molded outer body, and offering the device through a standard commercial channel as a product not associated with sex products.

In accordance with an embodiment of the invention there is provided a method of providing a user with a device for use as a sex toy by selling to the user an initial product employing a blow molded plastic bottle containing at least one of a food, a beverage, a cleaning product, and a beauty product.

In accordance with an embodiment of the invention there is provided a device for use as a sex toy by selling to the user an initial product employing a blow molded plastic bottle containing at least one of a food, a beverage, a cleaning product, and a beauty product.

In accordance with an embodiment of the invention there is provided a device comprising a blow molded outer body enclosing a predetermined region filled with a predetermined material and a vibrating element, the blow molded outer body sealed by crimping either end.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 3 depicts a blow molded adult device according to an embodiment of the invention;

FIG. 16 depicts an adult device according to an embodiment of the invention;

FIG. 18A depicts an assembly configuration and assembled adult device according to an embodiment of the invention;

FIG. 19 depicts an assembly configuration and assembled adult device according to an embodiment of the invention;

FIG. 20 depicts an assembly configuration and assembled adult device according to an embodiment of the invention;

FIG. 24 depicts blow molded adult device geometries according to embodiments of the invention.

DETAILED DESCRIPTION

Figures 1, 2:
FIG. 1 depicts a range of prior art passive adult devices.
FIG. 2 depicts a range of prior art active adult devices.

The present invention is directed to devices for sexual pleasure and more particularly to devices for sexual pleasure and more particularly to low cost and/or disposable devices exploiting blow molding, injection molding, or a combination thereof in conjunction with active and/or elements providing functions such as vibration, rigidity, movement, sensing, user sensations, communications, control and power.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments. It would also be evident that an embodiment may refer to a method or methods of manufacturing a device for sexual pleasure rather than the actual design of a device for sexual pleasure and that vice-versa an embodiment of the invention may refer to a device or devices rather than the method or methods of manufacturing.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, method, or characteristic "may", "might", "can" or "could" be included, that particular component, feature, structure, or characteristic is not required to be included. It would also be evident that an embodiment and/or the phraseology and/or terminology may refer to a method or methods of manufacturing a device for sexual pleasure rather than the actual design of a device for sexual pleasure and that vice-versa an embodiment and/or the phraseology and/or terminology may refer to a device or devices rather than the method or methods of manufacturing.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise the phrase "consisting essentially of", and grammatical variants thereof, when used herein is not to be construed as excluding additional components, steps, features integers or groups thereof but rather that the additional features, integers, steps, methods, components or groups thereof do not materially alter the basic and novel characteristics of the claimed composition, device or method. If the specification or claims refer to "an additional" element, that does not preclude there being more than one of the additional element or method.

A "personal electronic device" (PED) as used herein and throughout this disclosure, refers to a wireless device used for communications and/or information transfer that requires a battery or other independent form of energy for power. This includes devices such as, but not limited to, a cellular telephone, smartphone, personal digital assistant (PDA), portable computer, pager, portable multimedia player, remote control, portable gaming console, laptop computer, tablet computer, and an electronic reader.

A "fixed electronic device" (FED) as used herein and throughout this disclosure, refers to a device that requires interfacing to a wired form of energy for power. However, the device can access one or more networks using wired and/or wireless interfaces. This includes, but is not limited to, a television, computer, laptop computer, gaming console, kiosk, terminal, and interactive display.

A "server" as used herein, and throughout this disclosure, refers to a physical computer running one or more services as a host to users of other computers, PEDs, FEDs, etc. to serve the client needs of these other users. This includes, but is not limited to, a database server, file server, mail server, print server, web server, gaming server, or virtual environment server.

A "user" as used herein, and throughout this disclosure, refers to an individual engaging a device according to embodiments of the invention wherein the engagement is a result of their personal use of the device or having another individual using the device upon them.

A "vibrator" as used herein, and throughout this disclosure, refers to an electronic sexual pleasure device intended for use by an individual or user themselves or in conjunction with activities with another individual or user wherein the vibrator provides a vibratory mechanical function for stimulating nerves or triggering physical sensations.

A "dildo" as used herein, and throughout this disclosure, refers to a sexual pleasure device intended for use by an individual or user themselves or in conjunction with activities with another individual or user wherein the dildo provides non-vibratory mechanical function for stimulating nerves or triggering physical sensations.

An "adult device", sex toy" or "sexual pleasure device" as used herein, and throughout this disclosure, refers to a sexual pleasure device intended for use by an individual or user themselves or in conjunction with activities with another individual or user which can provide one or more functions including, but not limited to, those of a dildo and a vibrator. The sexual pleasure device/toy can be designed to have these functions in combination with design features that are intended to be penetrative or non-penetrative and provide vibratory and non-vibratory mechanical functions. Such sexual pleasure devices can be designed for use with one or more regions of the male and female bodies including but not limited to, the clitoris, the clitoral area (which is the area surrounding and including the clitoris), vagina, rectum, nipples, breasts, penis, testicles, prostate, and "G-spot." In one example a "male sexual pleasure device" is a sexual pleasure device configured to receive a user's penis within a cavity or recess. In another example, a "female sexual pleasure device" is a sexual pleasure device having at least a portion configured to be inserted in a user's vagina or rectum. It should be understood that the user of a female sexual pleasure device can be a male or a female when it is used for insertion in a user's rectum.

Texture as used herein, and throughout this disclosure, refers to a feel of a surface of a device and is generally described and/or defined in terms of smoothness, roughness, hardness, softness, waviness, and form. Such texturing may adjust the feeling of the device in respect of contact to a user and may control and/or adjust friction between the device and human skin/tissue. Surface texture may be isotropic or anisotropic. Textures may be, but not limited to, smooth, rough, ridged, dumped, grainy, and may refer to the visual and/or tactile qualities of the surface.

A "nubby" or "nubbies" as used herein, and throughout this disclosure, refers to a projection or projections upon the surface of a sexual pleasure device intended to provide additional physical interaction. A nubby can be permanently part of the sexual pleasure device or it can be replaceable or interchangeable to provide additional variation to the sexual pleasure device.

An "accessory" or "accessories" as used herein, and throughout this disclosure, refers to one or more objects that can be affixed to or otherwise appended to the body of a sexual pleasure device in order to enhance and/or adjust the sensation(s) provided. Such accessories can be passive, such as nubbies or a dildo, or active, such as a vibrator.

A "balloon" as used herein, and throughout this disclosure, refers to an element intended to adjust its physical geometry upon the injection of a fluid within it. Such balloons can be formed from a variety of elastic and non-elastic materials and be of varying non-inflated and inflated profiles, including for example spherical, elongated, wide, thin, etc. A balloon may also be used to transmit pressure or pressure fluctuations to the sexual pleasure device surface and user where there is an inappreciable, or very low, change in the volume of the balloon.

FIGS. 1 and 2 depict a range of prior art passive and active adult devices respectively showing the typical shapes etc. that make each of these immediately evident as an adult device.

FIG. 3 depicts a blow molding concept for adult devices according to an embodiment of the invention in first to fifth images 310 to 360 respectively applied to a bottle shaped adult device depicting:

First image 310—perspective view of blow molded adult device with and without lid attached;

Second image 320—perspective view of top of blow molded adult device with and without lid attached Third image 330—perspective view of closed end of blow molded adult device;

Fourth image 340—perspective view of open end with sealing cap of blow molded adult device;

Fifth image 350—perspective view of sealable end of blow molded adult device with fluid disposed within prior to sealing;

Sixth image 360—perspective view of sealable end of blow molded adult device with fluid disposed within and sealing cap proximate opening prior to sealing.

As discussed within this specification embodiments of the invention provide low cost disposable adult devices as well as providing adult devices in manners crossing barriers relating to culture, etc. In this manner, an adult device appearing to be a common consumable object such as bottle may be beneficial when compared to prior art solutions such as "lip stick" vibrators which tend to be very small. In contrast an adult device masquerading as a bottle can be larger, cheaper, disposable, etc.

Figure 4:
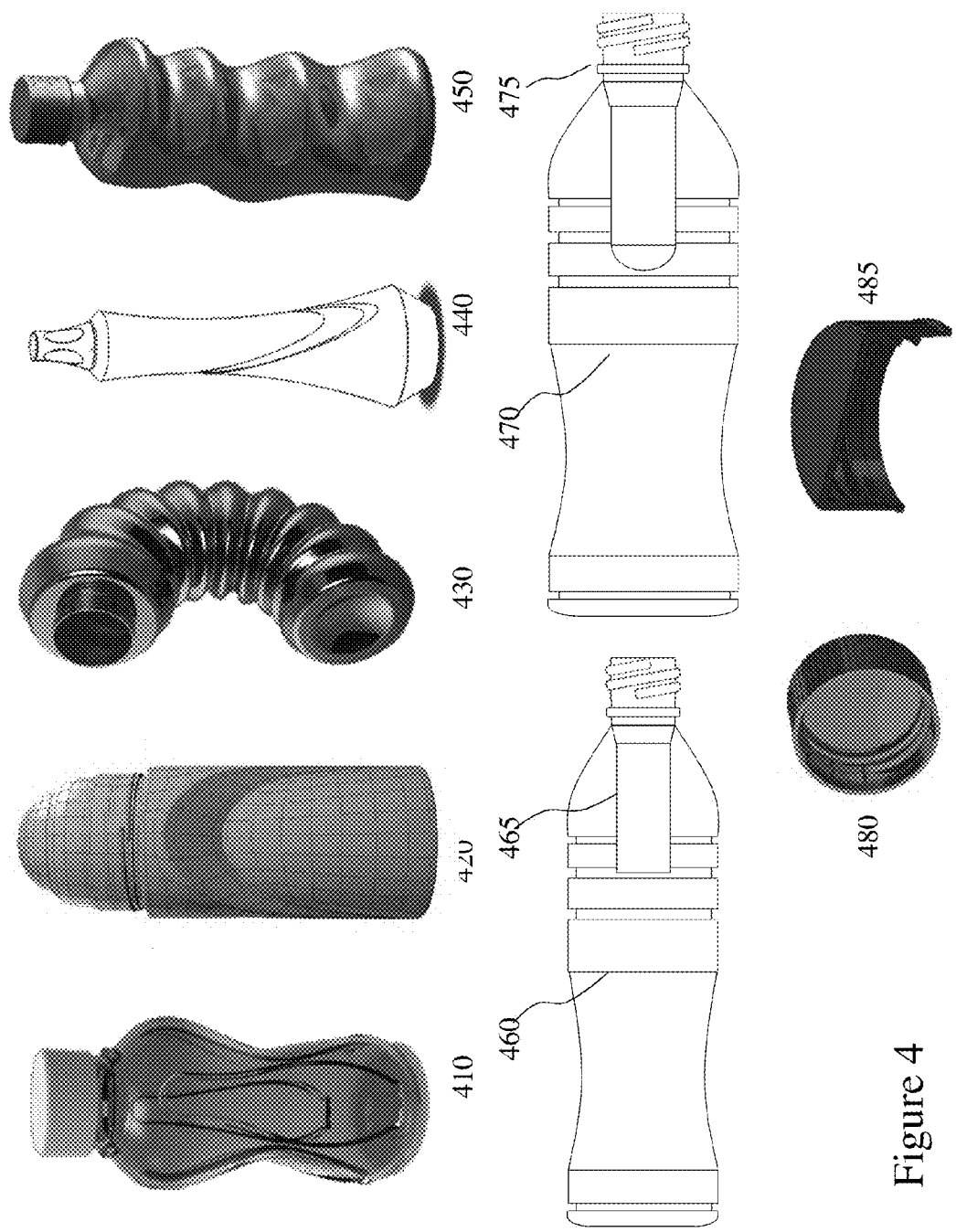
FIG. 4 depicts a range of blow molded adult device geometries according to embodiments of the invention.

FIG. 4 depicts a range of blow molded adult device geometries according to embodiments of the invention including double egg 410, hooked 420, ribbed 430, tapering 440, and asymmetric 450. Also depicted are first and second abrupt tapering geometries 460 and 470 which each contain vibrator inserts 465 and 475 respectively. Also depicted is sealing cap 480 which is also depicted in cross-section 485. It would be evident that the sealing cap and sealable opening to the adult device may be formed using designs which have been standardized within the plastics industry for non-adult device devices in order to reduce the design requirements and support designs that have manufacturing volumes at levels supporting the target markets and user characteristics for the adult devices according to embodiments of the invention. Accordingly, it would be evident that the blow molded adult device may be manufactured with a range of dimensions from those with capacities of tens of milliliters and physical dimensions of the order 75-125 mm (3-5 inches) long and 25-35 mm (1-1.5 inch diameter) to those holding hundreds of milliliters and dimensions of 125-250 mm (5-10 inches) long and 35-75 mm (1.5-3 inch diameter) to those with capacities of 1-2 liters and above. For example, a 1 liter bottle may be ~240 mm long by 88 mm diameter (~9.5×3.5 inches) and a 2 liter bottle ~300 mm long by ~110 mm diameter (~12×4.3 inches). However, bottles may be tapered, gourd shaped, double bulbed, square, elliptical, and polygonal in cross-section as well.

For example, a container's neck finish holds the cap, stopper, or closure with protruding threads and the container and its corresponding cap must have matching finishes. For example, a 24/400 bottle will only accept a 24/400 closure. Typically, screw thread or continuous thread closure sizes are expressed with two numbers separated by a hyphen or slash. The first number refers to the millimeter diameter measured across the outside of the bottle's threads. The second number refers to the thread style, "GPI" or "SPI" finish. The Glass Packaging Institute (GPI) and Society of the Plastics Industry (SPI) have established uniform standards for glass and plastic container neck finishes. Common GPI/SPI neck finishes include:

400—1 thread turn
410—1.5 thread turns
415—2 thread turns
420—2 thread turns, tall
425—2 thread turns with narrow threads
430—buttress finish with thick threads and top bead;

2030—lug finish with non-continuous threads; and
2035—lug finish with non-continuous threads, tall.

Other dimensions include:

T Dimension: The outside diameter of the thread. The tolerance range of the "T" dimension will determine the mate between bottle and closure.

I Dimension: The inner diameter of the bottle neck. Specifications require a minimum "I" to allow sufficient clearance for filling tubes. Linerless closures, with a plug or land seal, and dispensing plugs and fitments require a controlled "I" dimension for a proper fit.

S Dimension: Measured from the top of the finish to the top edge of the first thread. The "S" dimension defines the height of the thread start and accordingly determines the amount of thread engagement between the bottle and cap.

E Dimension: The outside diameter of the neck. The difference between the "E" and "T" dimensions divided by two determines the thread depth.

H Dimension: The height of the neck finish. Measured from the top of the neck to the point where the diameter "T", extended down, intersects the shoulder.

Accordingly, "T" dimensions may, for example, include 13 mm, 15 mm, 18 mm, 20 mm, 22 mm, 24 mm and dimensions downwards and upwards from these.

Caps or screw caps may be lined, unlined, ribbed, smooth, domed, smooth ball caps, push-down and pull-up child resistant caps, tamper evident caps, and with foam induction liners. Alternatively, adult devices may exploit other closures including, but not limited to, sports "pop-up/push-down" tops, flip-top caps, and hinged caps.

Today, polyethylene terephthalate (PET) is one of the most commonly used plastics within consumer products such as adult devices. PET adult devices are made with two different processes, a single-stage process, injection stretch blow molding (ISBM) and a dual-stage process, injection molding (IM) and reheat stretch blow molding (SBM). Within the single-stage process the preforms and adult devices are both made within the same machine. These machines feature 3 or 4 stations comprising injection, optional conditioning, blow, and ejection. Dried PET resin is melted in an extruder and injected into vertically arranged cavities. The finished preform is held by the neck inserts whilst it is removed from the injection core and cavity. The machine rotates 90 degrees on machines with conditioning and 120 degrees on machines without. Preforms are then conditioned (optional step), blown and finally stripped off the neck inserts. Because of this procedure there is no parting or witness line in the body of the preform, only in the necks. Such an over-molding feature for preforms may employ a single common material or different materials in different preform sections.

Figure 5:
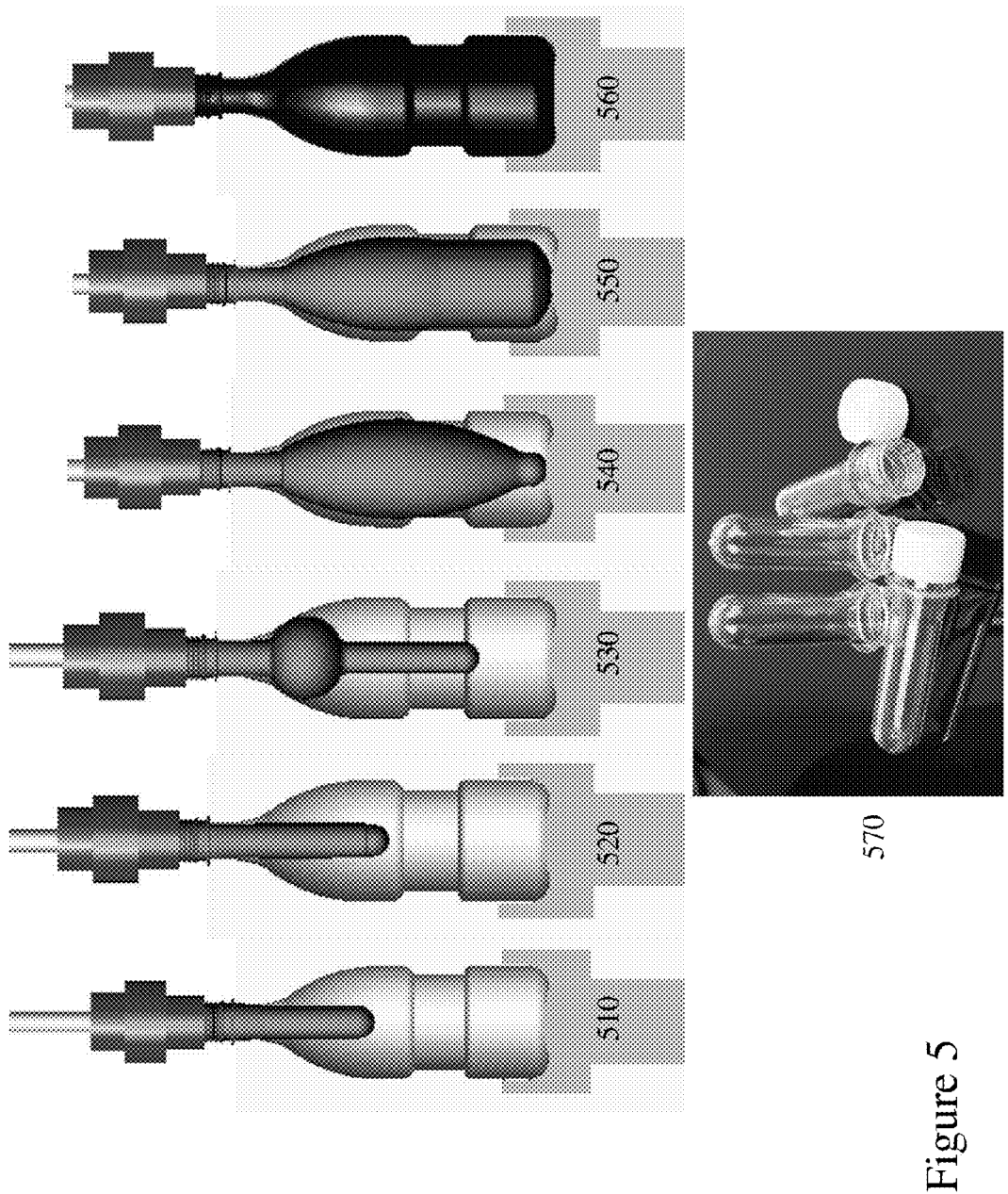
FIG. 5 depicts a typical blow molding process according to the prior art exploiting a preform.

In the two-stage process preforms are injection molded and subsequently re-heated as described below in respect of FIG. 5 for a typical blow molding process according to the prior art exploiting a preform. Accordingly, FIG. 5 depicts what is known as a two-stage stretch blow (SBM) molding process. In the SBM process, the plastic is first molded into a "preform" using an injection molding process such as described below in respect of FIG. 6. These preforms are produced with the necks of the adult devices, including threads (the "finish") on one end. These preforms are packaged, and fed later (after cooling) into a reheat stretch blow molding machine. In the SBM process, the preforms are heated (typically using infrared heaters) above their glass transition temperature, then blown using high pressure air into adult devices using metal blow molds. This is depicted in first to sixth blow images 510 to 560 respectively whilst preform image 570 depicts clear preforms with their screw caps. The preform is always stretched with a stretch rod as part of the process. The advantages of this process are that very high volumes can be produced, there are little restrictions on adult device design, and the preforms may be sold/purchases as a completed item from a third party to blow subsequently into any desired adult device shape. Amongst the disadvantages are generally a high capital cost, high floor space requirements and it suits round adult devices better than oblong ones.

Figure 6:
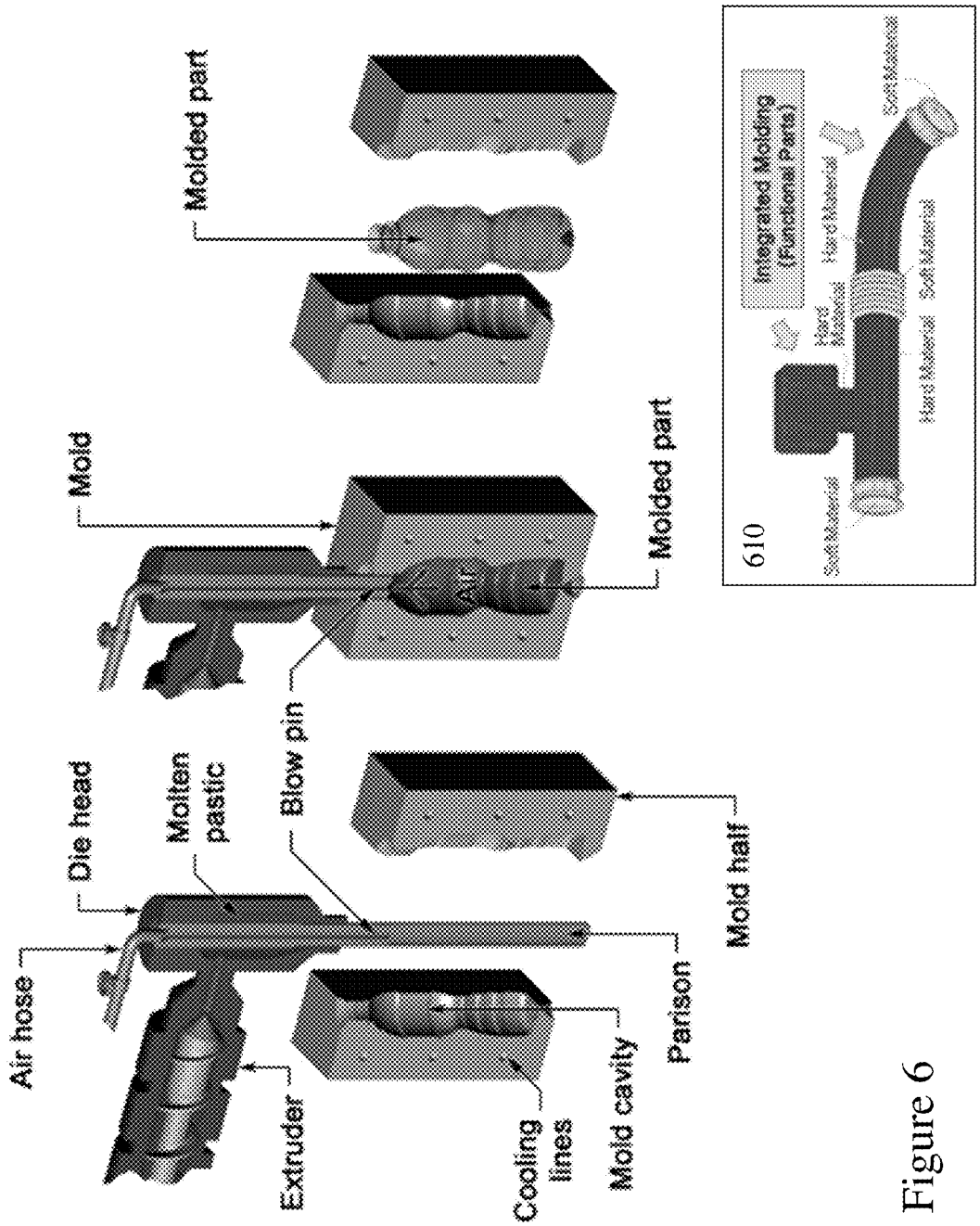
FIG. 6 depicts a typical blow molding process according to the prior art exploiting direct blow molding from extruded tubing.

FIG. 6 depicts an extrusion blow molding (EBM) process according to the prior art exploiting direct blow molding from extruded tubing. As depicted plastic is melted and extruded into a hollow tube (a parison). This parison is then captured by closing it into a cooled metal mold. Air is then blown into the parison, inflating it into the shape of the adult device body, container, or part. Air can be transferred with blow pins or blow needles depending on the application. After the plastic has cooled sufficiently, the mold is opened and the part is ejected. Continuous and Intermittent are two variations of Extrusion Blow Molding. In Continuous EBM the parison is extruded continuously and the individual parts are cut off by a suitable knife. In Intermittent EBM there are two processes: straight intermittent is similar to injection molding whereby the screw turns, then stops and pushes the melt out. This process is known as the reciprocating screw process. With the accumulator method, an accumulator gathers melted plastic and when the previous part has cooled and enough plastic has accumulated, a rod pushes the melted plastic and forms the parison. In this case the screw may turn continuously or intermittently. With continuous extrusion the weight of the parison drags the parison and makes calibrating the wall thickness difficult. The accumulator head or reciprocating screw methods use hydraulic systems to push the parison out quickly reducing the effect of the weight and allowing precise control over the wall thickness by adjusting the die gap with a parison programming device.

Advantages of EBM include low tool and die cost, fast production rates, the ability to mold complex parts; and handles may be incorporated into the design. Amongst the disadvantages are that it's limited to hollow parts and low resistance to gas and vapor ingress and egress. To increase barrier properties multilayer parisons of different materials are typically employed and pose challenges to recycling.

It is also possible to inject two different materials, one hard and one soft, sequentially. This is accomplished by two extruders, each with the respective material and extruding the materials at different times or at different speeds into a special head from where they flow out. This results in a part that has a soft section with a stiff section on either side where the length of the sections does not have to be equal. Materials that can be combined are HDPE or nylon and TPE for example but other combinations are also possible.

The optimal multi-layer process would be two layers: an inner one with a flexible material like LDPE and an outer one that gives a soft-touch surface. This could be made on a standard machine with a special 'head', which is the part that gives the parison its shape. That head would have a small satellite extruder feeding the outside layer of about 20% of the total.

In addition to EBM and SBM processes there is injection blow molding (IBM) where the polymer is injection molded onto a core pin which is then rotated to a blow molding station to be inflated and cooled. This is generally the least-used of the three blow molding processes, and is typically used to make small medical and single serve bottles. The process is divided into three steps: injection, blowing and ejection.

The IBM machine utilizes an extruder barrel and screw assembly which melts the polymer which is then fed into a hot runner manifold where it is injected through nozzles into a heated cavity and core pin. The cavity mold forms the external shape and is clamped around a core rod which forms the internal shape of the preform. Preform orientation is horizontal and there is a parting line going along the entire body and neck. Horizontal orientation allows undercuts in the longitudinal direction which is not possible with ISBM. This can be helpful to direct material in adult device areas with larger geometry. The preform consists of a fully formed neck with a thick tube of polymer attached, which will form the body. The preform mold opens and the core rod is rotated and clamped into the hollow, chilled blow mold. The end of the core rod opens and allows compressed air into the preform, which inflates it to the finished article shape. After a cooling period the blow mold opens and the core rod is rotated to the ejection position. The finished article is stripped off the core rod and as an option can be leak-tested prior to packing.

Advantages of IBM include the ability to produce an injection molded neck for accuracy. However, it only suits small capacity adult devices as it is difficult to control the base centre during blowing, there is no increase in barrier strength as the material is not biaxially stretched, and handles cannot be incorporated. Beneficially, EBM in comparison to other forms of blow molding, in addition to a lower tool cost, allows for the weight and wall thickness of the parts to be changed without requiring a tool change. This is possible because the die gap through which the material flows can be manipulated during production. This allows tailoring of it to fit container geometry as well as dialing in a specific weight and wall thickness. It is therefore possible to use the same molds to make both a lightweight and highly flexible part and a much more rigid, heavier part. Moving mold parts are common in EBM for industrial and automotive parts. Usually, they are activated with hydraulic cylinders rather than the cams that are typical for injection molding. Moving mold parts, however, do increase the mold costs considerably and accordingly it is normally an issue of how to lay the parting line during the design phase thereby avoiding any moving mold parts.

With respect to EBM then this process allows for the production of adult devices in a wide variety of materials, including but not limited to High-Density PolyEthylene (HDPE), Low-Density PolyEthylene (LDPE), polypropylene (PP), polyvinyl chloride (PVC), BAREX® acrylonitrile-methyl acrylate copolymers, polyethylene terephthalate (P.E.T.), K Resin, polyethylene terephthalate glycol-modified (P.E.T.G.), Acrylonitrile Butadiene Styrene (ABS), acetal, acetates (such as EVOH), aliphatic polyamides (known as various forms of nylon), co-polyester, polycarbonates (PCs), silicones, and thermoplastic vulcanizates (TPVs).

IBM allows for the production of adult devices in a variety of materials, including, but not limited to, HDPE, LDPE, PP, PVC, BAREX®, P.E.T., and polycarbonate. In respect to ISBM then in addition to P.E.T. a number of other materials have been stretch blown, including, but not limited to, polypropylene, HDPE, polycarbonate, and various bio-resins. With time and technology evolution more materials will lend themselves to stretch blow molding as their molecular structures are altered to suit this process.

Alternatively convoluted 3D injection molding allows the formation of single piece-parts such as depicted in insert 610 comprising one or more hard plastic portions with one or more soft/elastomeric plastic portions. It would also be evident that embodiments of the invention in addition to the materials described supra that biodegradable "plastics" such as corn plastic may be employed, wherein corm plastic is a kind of polylactide, or PLA, plastic. Polylactides are made from the resin of corn and other plants and in some jurisdictions such as the United States approved for use in food packaging, which as may be evident from descriptions in respect of FIG. 21, for example, allow biodegradable polylactide based adult devices to further blur the boundary of adult device and food packaging.

By designing the parting line of a blow mold into the right axis it would be possible to design a mold such, that for example so-called rabbit or G-spot adult devices could be implemented using a single piece with only a few design changes. This has the advantage that no seals are required for the part itself to make it water proof. Using a standard two-piece closure, which means a cap with a liner inside, then a battery compartment may also be sealed cost-effectively. Large openings in EBM manufacturing, those typically greater than 50 mm or so, are usually blown with a dome that is cut off afterwards. This is a standard process and wide-mouth cutters are ubiquitous. Accordingly, as part of the molding process battery compartments may be formed economically in addition to features such as handles, threads, etc.

Twin sheet thermoforming is another process suitable to produce adult devices. Within this process two plastic sheets are heated simultaneously and then fused together during the thermoforming process. They can also be filled with foam at that time. They could be of different color and have different geometries and/or wall thickness on either side. A number of materials are available for this process, including, for example high impact polystyrene (HIPS), polyacrylonitrile butadiene styrene (ABS), thermoplastic polyolefin (TPO), HDPE, PP, thermoplastic polyurethane (TPU), and PET modified with cyclohexanedimethanol (PETG).

Insert molding is done in EBM manually and handles are inserted in molds automatically in the stretch blow molding (SBM) process. The latter requires hooks that the material flows around to secure the insert. Manual insert molding can add cost to the part. However, it is possible to mold a so-called "ship-in-a-bottle" part where a motor and other parts, for example, are placed at the bottom of the mold and the parison flows over them.

EBM may also be used for the blow molding of thermoplastic elastomers (TPEs) to form rubber-like articles or rubber-like elements of articles. TPEs are a class of copolymers or a physical mix of polymers, typically a plastic and a rubber, which consist of materials with both thermoplastic and elastomeric properties. Classes of TPEs include styrenic block copolymers, polyolefin blends, elastomeric alloys, thermoplastic polyurethanes, thermoplastic copolyester and thermoplastic polyamides. As with other EBM materials such TPEs benefit from coreless flash free molding, ability to form complex shapes, exploit sequential material construction, and utilize multiple layers. Accordingly, single layer TPE EBM processing exploits one grade of thermoplastic rubber pellets to create a hollow part allowing small parts to be extruded continuously in a single layer. Multi-layer parts are generally produced via the intermittent or continuous extrusion of several materials. The process is excellent for applications requiring multi-functionality such as a barrier resin that cannot come in contact with the environment, or a combination of soft and hard materials using both rubbery and plastic properties in different ways. Sequential parts are produced through the successive extrusion of two or more materials, or differing grades of one material.

For example, hard and soft grades of Santoprene™ rubber can be used when mobility and sealing properties are needed in a single component. Alternatively, for example, a hard grade of Santoprene™ rubber can also be alternated with polypropylene for applications that need both local flexibility and stiffness. A major advantage of Santoprene™ rubber is its ability to be processed in virtually any color by blending the TPE pellets with the appropriate colorant or in some instances pre-colored pellets are available from several sources. For stability, compatibility and dispersion, solid color concentrates are typically a preferred method of coloring TPEs as they consist of a pigment compounded with a carrier resin and are dust-free, easy-to-use, and they can be tumble-blended or accurately metered.

In addition to these techniques rotational molding, commonly referred to as rotomolding, is another process that may be applied to produce adult devices according to embodiments of the invention. It is similar to the other blow molding processes in that it produces hollow containers. However, a rotomold is first filled with plastic in granular, powder, or liquid form. The shell-type mold is then closed and starts to rotate in two axes at a slow speed while it is heated up at the same time. The resin now adheres to the mold walls forming a solid layer in the process. The mold is then cooled and the plastic solidifies while the mold is still rotating. Rotation stops when the plastic is cool enough so it won't deform when the mold is opened and the part taken out.

Suitable resins are polyethylene, both standard and cross-linked, polypropylene, ethylene vinyl acetate, polycarbonate, elastomers, polyurethane, ethylene vinyl acetate, polyamide, and fluorocarbons. As a result of the different process rotomolded parts do not suffer the same undercut restrictions as other forms of blow molding. It is possible to make items with very elaborate protuberances and parts that do not feature weld lines. Molds are inexpensive and can be made in single or multiple cavities.

Figure 7:
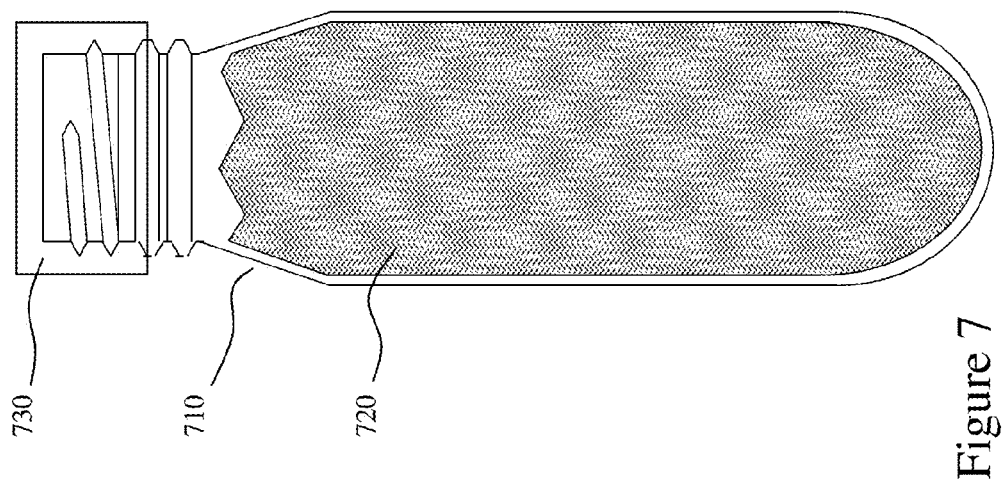
FIG. 7 depicts an adult device according to an embodiment of the invention.

Now referring to FIG. 7 there is depicted an adult device according to an embodiment of the invention comprising a blow molded (BM) body 710 with screw-thread onto which is fitted cap 730. The inner hollow portion of BM body 710 as depicted has been filled with a fluid 720 such as water, for example. Accordingly, a user may purchase an empty BM body 710 with or without cap 730. In some embodiments of the invention the cap 730 and its matching thread on the BM body 710 are designed to be common to a standard commodity item such as bottle of carbonated drink such that the cap 730 may be obtained from the commodity item for use with the BM body 710 or may be replaced in the event of loss of such a cap. Optionally, the BM body 710 may be sold as a container for a drink and subsequently used with the drink as sold or after replacement with water as an adult device. In some cultures this may present a route to market that avoids the stigma potentially associated with the purchase and/or use of an adult device. As discussed below the BM body 710 may be chosen to be coloured, white, black, transparent, tinted, etc. towards a demographic and likewise may be sold in multiple sizes with varying length and diameter.

In some embodiments of the invention the BM body 710 may contain a marker line such that when filled with water it may be safely frozen without the expanding water below approximately 4° C. rupturing the BM body 710 or pushing the cap 730 off. Alternatively it may be filled with hot water, room temperature water, cold water, water from a refrigerator etc. Within other embodiments of the invention the fluid may be other liquids, including, for example, alcoholic spirits, alcohol, a vegetable oil or oils, mineral oil or oils, a silicone or silicones, and a synthetic oil or oils. Such options provide alternate channels to market for simple dildo type adult devices at dimensions suitable for use without necessarily being immediately evident as a sex toy. For example, a 1" (25 mm) diameter by 6" (150 mm) BM body holds approximately 75 $cc^3$ or approximately 75 ml of fluid, which is more than a double shot of spirits (60 ml) sold in India. At 8" (200 mm) this volume increases to approximately 100 ml of fluid.

Figure 8:
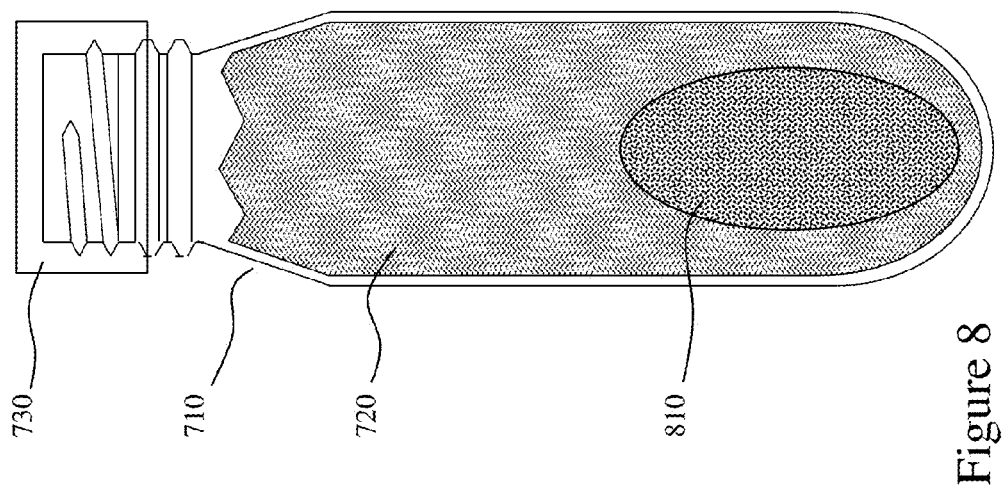
FIG. 8 depicts an adult device according to an embodiment of the invention.

Now referring to FIG. 8 there is depicted an adult device according to an embodiment of the invention comprising the blow molded (BM) body 710 with screw-thread onto which is fitted cap 730 as depicted and described supra in respect of FIG. 7. The inner hollow portion of BM body 710 as depicted has been filled with a fluid 720 such as water, for example. However, now within the BM body 710 there is now disposed a vibrator 810, such as a so-called "egg" vibrator employing a wireless interface to provide remote control operations. Typically, liquids are not considered good acoustic media but this is primarily when considering sound penetration from an air interface. However, within a liquid such as water sound propagation at supported frequencies is actually better than air. At frequencies defined by 1 Hz<<f<<20 kHz the attenuation of water is low, such that at 1 kHz it is 0.06 dB/km at T=20° C.

Figure 9:
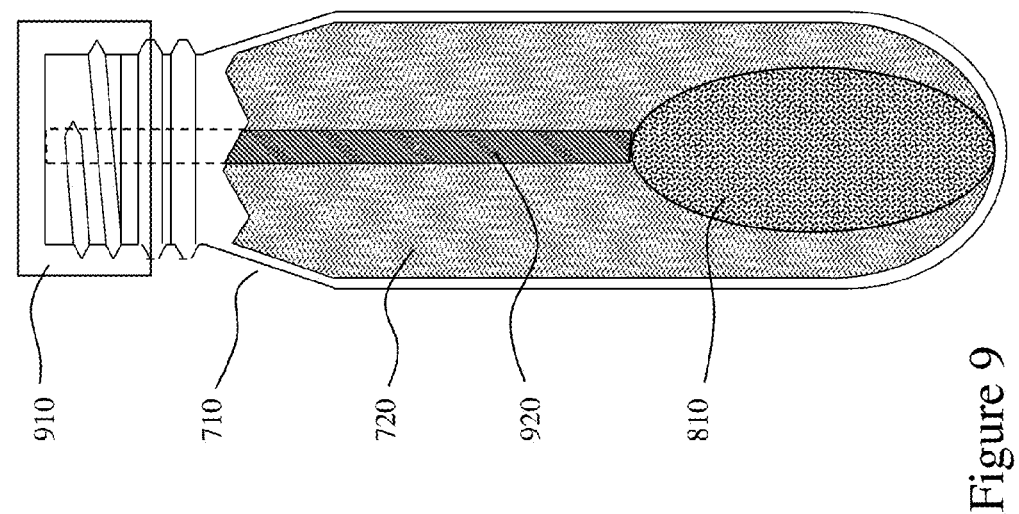
FIG. 9 depicts an adult device according to an embodiment of the invention.

Accordingly, a user may purchase an empty BM body 710 with or without cap 730, fill it with water or another suitable fluid, and drop a bullet/egg vibrator within and experience the effects of a vibrator without having to purchase a clearly phallic device. A discrete small vibrator, e.g. a 50 mm by 15 mm diameter vibrator can be used to make a 200 mm by 25 mm diameter with ease from an apparently consumable plastic container and a simple fluid such as water. Referring to FIG. 9 there is depicted a variant of FIG. 8 wherein a positioning bar 920 is disposed between the inner surface of the screw cap 730 and the vibrator 810 such that it is pushed against the end of the BM body 710. In this manner the positioning bar 920 may limit movement of the vibrator 810 during the movement of the final assembly by the user. Optionally, the positioning bar 920 may support placement of a vibrator 810 at a position within the BM body 710 other than against the inner end surface.

Figure 10:
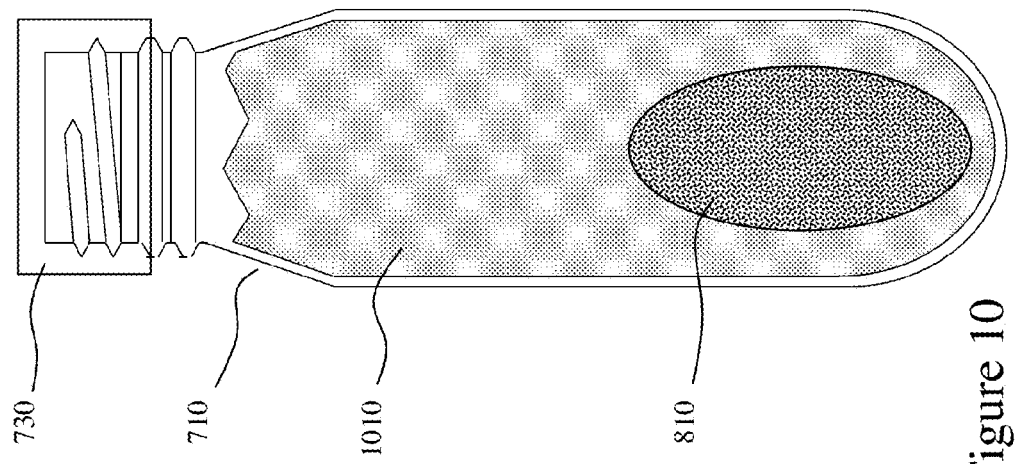
FIG. 10 depicts an adult device according to an embodiment of the invention.

Now referring to FIG. 10 there is depicted an adult device according to an embodiment of the invention comprising the blow molded (BM) body 710 with screw-thread onto which is fitted cap 730 as depicted and described supra in respect of FIG. 7. The inner hollow portion of BM body 710 as depicted has been filled with a foam 1010 after the vibrator 810 has been placed within it. Examples of foam 1010 include, but are not limited to, open cell polyurethane of the ester and ether based forms.

It would be evident to one skilled in the art that the foam 1010 may expand once inserted into the body of the adult device expanding one or more collapsed regions of the body such that an initially smaller more discreet body may be sold before being filled, expanded and employed as an adult device. In this instance the foam 1010 may provide a lighter adult device than in the instances that the BM body 710 is filled with a liquid such as described supra in respect of FIG. 8. Examples of such foams may include, but not be limited to, expanding foam insulation, expanding foam sealant, polyurethane based expanding foam, latex based insulation foam.

Figure 11A:
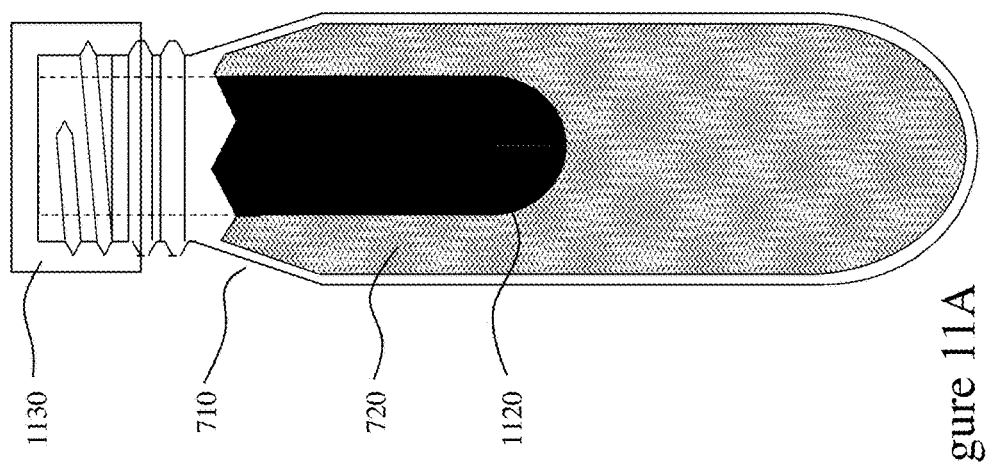
FIGS. 11A and 11B depict adult devices according to an embodiment of the invention.

Now referring to FIG. 11A there is depicted an adult device according to an embodiment of the invention comprising the blow molded (BM) body 710 with screw-thread onto which is fitted cap 1130 as depicted and described supra in respect of FIG. 7. As with the adult device depicted in FIG. 7 the BM body 710 is filled with a fluid by the user or may be pre-filled at purchase with a fluid. However, cap 1130 is now part of a vibrator assembly which also includes vibrator body 1120. Accordingly, the vibrator assembly may be purchased separately to the BM body 710 or purchased initially with a BM body 710. However, the user may dispose of the BM body 710 and replace as frequently as they define and may, in fact, as described supra purchase BM body 710 through a non-traditional adult device sales channel. The user may also easily change BM body 710 with a range of BM bodies 710 according to their preference or a preference of their partner.

Figure 11B:
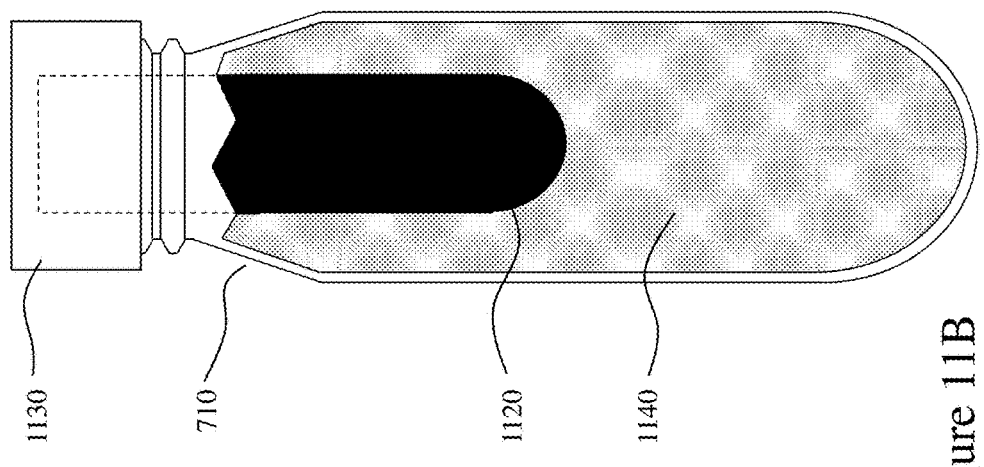

Referring to FIG. 11B there is depicted an adult device according to an embodiment of the invention comprising the blow molded (BM) body 710 with screw-thread onto which is fitted cap 1130 as depicted and described supra in respect of FIG. 7. As with the adult device depicted in FIG. 10 the BM body 710 is filled with foam 1140 and the cap 1130 is now part of a vibrator assembly which also includes vibrator body 1120. Accordingly, the vibrator assembly may be purchased separately to the BM body 710 or purchased initially with a BM body 710. However, the user may dispose of the BM body 710 and replace as frequently as they define and may, in fact, as described supra purchase BM body 710 through a non-traditional adult device sales channel. The user may also easily change BM body 710 with a range of BM bodies 710 according to their preference or a preference of their partner.

Within FIGS. 11A and 11B and other embodiments of the invention wherein an end of the vibrator assembly and/or vibrator body provides sealing to the opening of the BM body then it would be evident that optionally the control(s) and charging contact(s) of the active vibratory element may be provided on the top surface of the sealing mechanism so that they are accessible externally once the BM body and vibratory element have been combined.

Figure 12B:
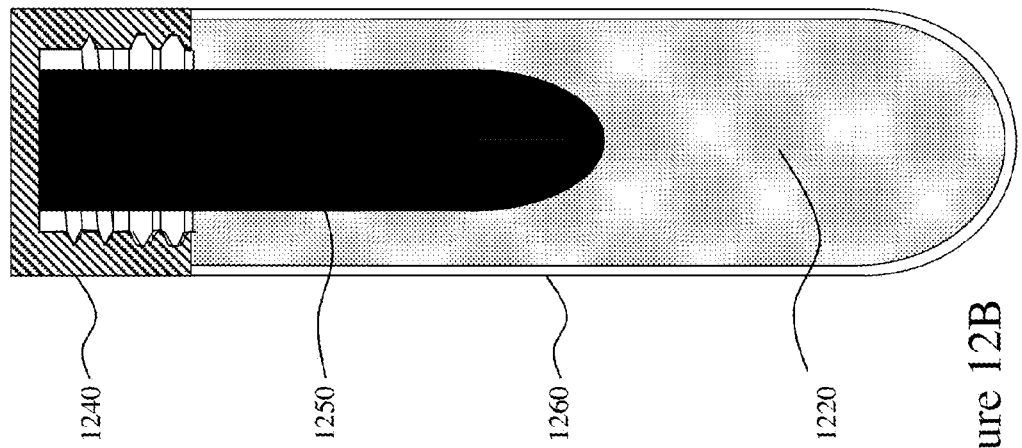
FIGS. 12A and 12B depict adult devices according to an embodiment of the invention.
Figure 12A:
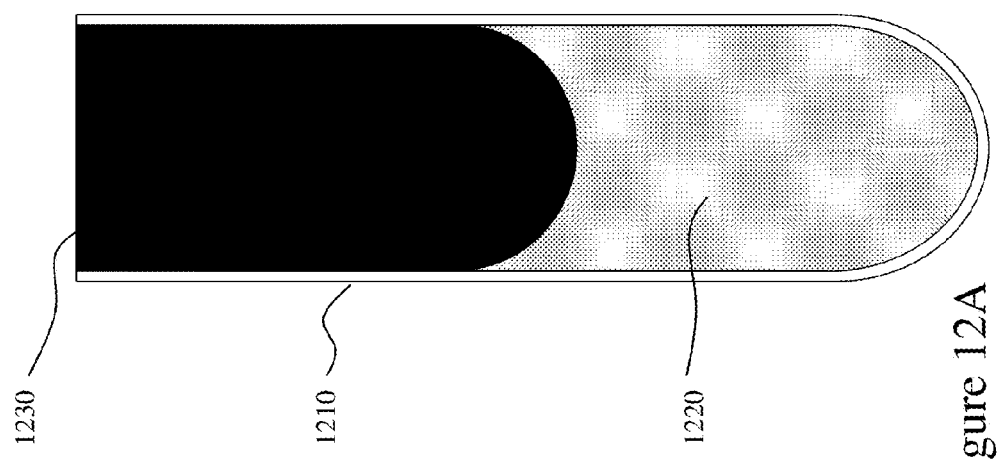

Now referring to FIG. 12A there is depicted an adult device according to an embodiment of the invention comprising the blow molded (BM) body 1210 but now without screw-thread and absent the fitted cap. In this instance the BM body 1210 has been pre-filled with foam 1220, such as described supra in respect of FIG. 10, wherein the BM body 1210 and foam 1220 have been designed to fit onto a vibrator 1230. Accordingly, a small compact vibrator 1230 may be turned into a large vibrating adult device through its placement within the cavity at the end of the BM body 1210. Again, a variety of BM bodies 1210 may be sold as disposable/consumable elements in conjunction with a vibrator 1230. Optionally the BM body 1210 may comprise a threaded end and have a cap with a positioning bar such as described and depicted in respect of FIG. 9 such that the cap and positioning bar maintain a small vibrator in position within the modified BM body 1210 and in contact with the foam 1220.

Now referring to FIG. 12B there is depicted an adult device according to an embodiment of the invention comprising the blow molded (BM) body 1260 with screw-thread. In this instance the BM body 1260 has been pre-filled with foam 1220, such as described supra in respect of FIG. 12A, wherein the BM body 1260 and foam 1220 have been designed/formed to fit onto a vibrator 1250. Accordingly, a small compact vibrator 1250 may be turned into a large vibrating dildo through its placement within the cavity at the end of the BM body 1260. Again, a variety of BM bodies 1260 may be sold as disposable/consumable elements in conjunction with a vibrator 1250.

Figure 14:
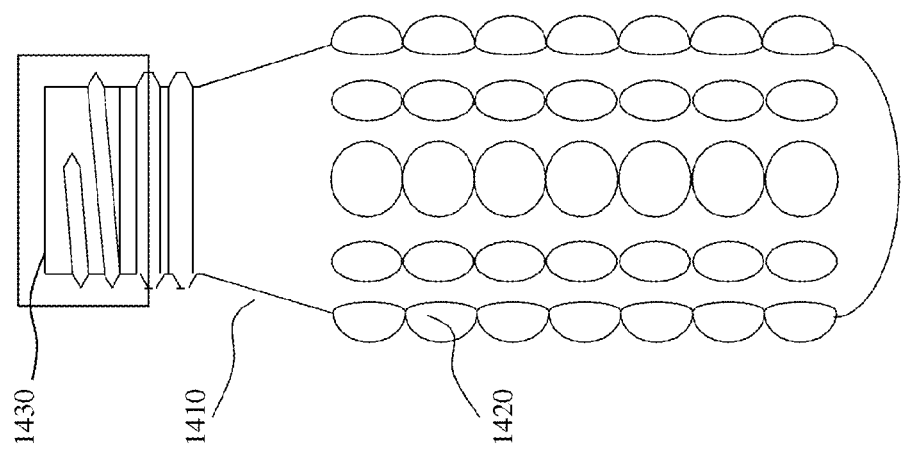
FIG. 14 depicts an adult device according to an embodiment of the invention.
Figure 13:
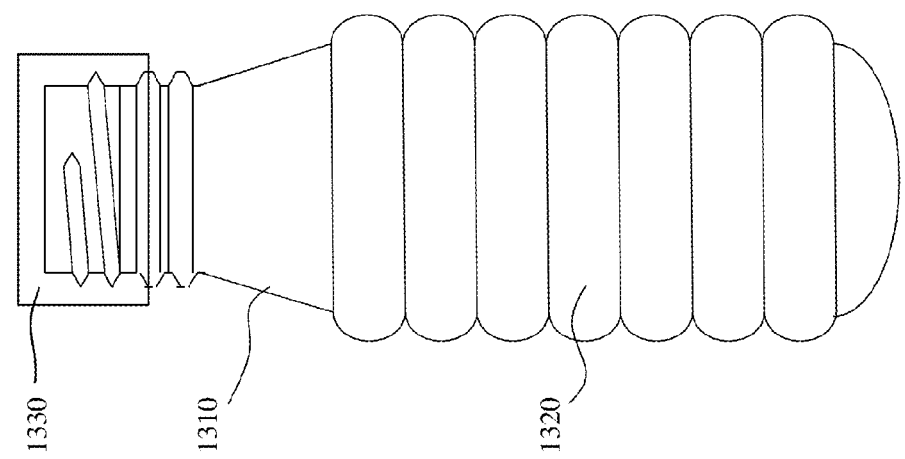
FIG. 13 depicts an adult device according to an embodiment of the invention.

Now referring to FIGS. 13 and 14 there are adult devices according to embodiments of the invention wherein the outer profile of the BM bodies 1310 and 1410 have been formed with a series of rings 1320 and nubbies 1420 respectively. Each maintains the cap 1330 and 1430 for filling with fluid for a dildo, filling with fluid and vibrator element for vibrating dildo/vibrator, etc. such as described supra in respect of FIGS. 7 through 12 respectively.

Figure 15:
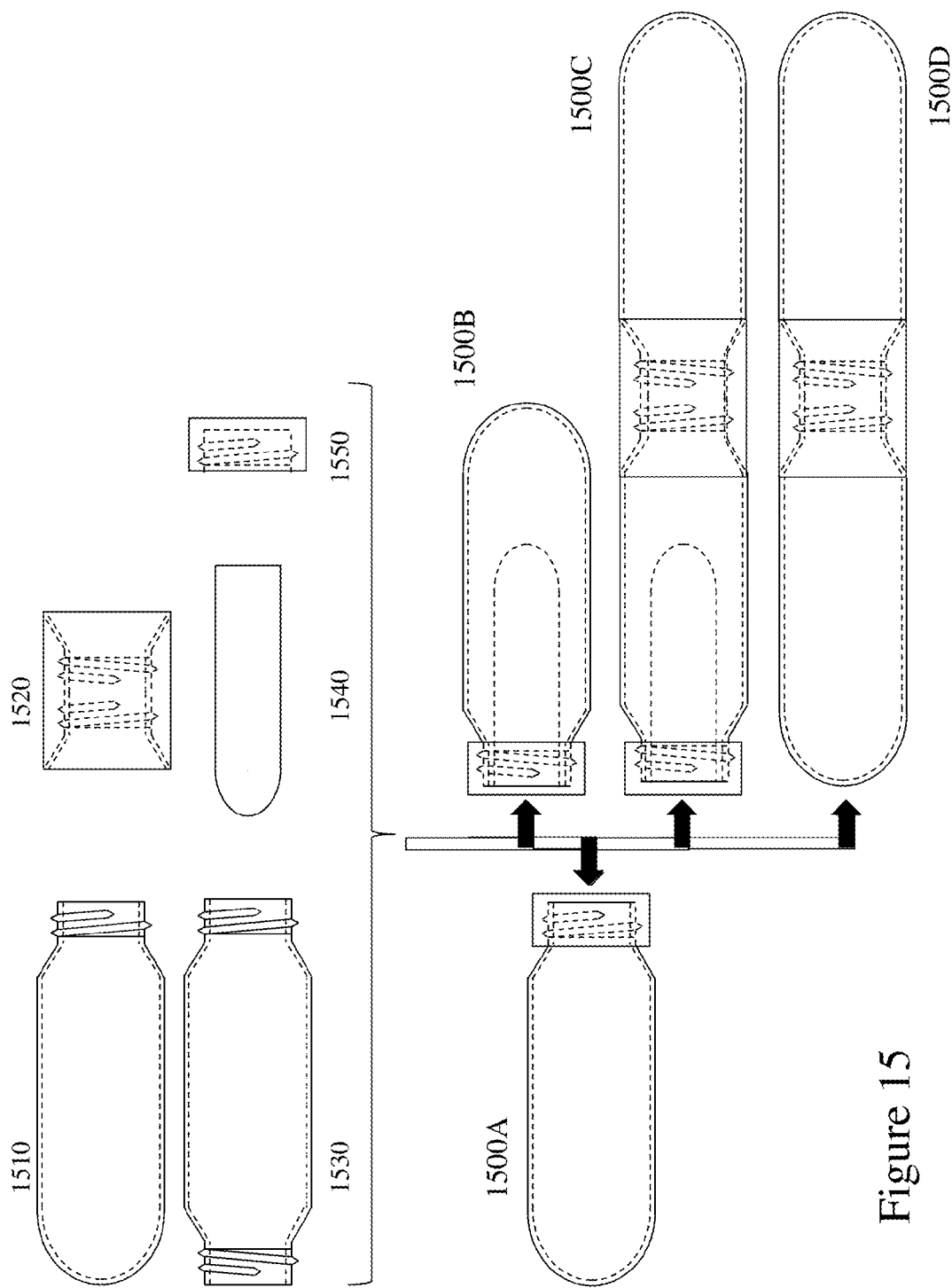
FIG. 15 depicts an approach to modular adult devices according to an embodiment of the invention.

FIG. 15 depicts an approach to modular adult devices according to an embodiment of the invention. Accordingly, there are depicted BM body 1510, BM extender 1530, BM joint 1520, vibrator element 1540 and screw cap 1550. These may, for example, be purchased as discrete elements in a single purchase, over multiple purchases, etc. or purchased as a set. Accordingly, the user may assemble, according to the elements they have purchased a variety of adult devices including, for example, small dildo 1500A, small vibrator 1500B, long vibrator 1500C, and doubled ended dildo 1500D. Accordingly, a user may purchase initially a vibrator together with a container, not shown for clarity, comprising BM body 1510 and screw cap 1550. Subsequently, they can add additional elements, replace different elements, dispose of elements etc. at low cost allowing them to, in different circumstances explore dimensions of adult devices to find what is comfortable or giving them best sensations, adjust the adult device to their current desire/need, adjust the toy to their partner's desires/interest etc. In other embodiments of the invention BM joint 1520 may be designed with a central deformable region allowing the assembled toy to be flexed over a predetermined range of angles allowing the adult device to conform to the user's body.

Now referring to FIG. 16 there is depicted an adult device according to an embodiment of the invention comprising the blow molded (BM) body 1610 but without screw-thread and absent the fitted cap. In this instance the BM body 1610 has been pre-filled with foam 1620, such as described supra in respect of FIG. 10, wherein the BM body 1210 and foam 1220 have been designed to provide an opening of a minimum diameter and the foam 1220 is compliant to allow insertion of objects larger than the minimum diameter. The fit onto an inserted object is therefore akin to a friction coupling and to ease movement of the adult device a lubricating layer 1640 may be provided. Accordingly, the adult device as depicted in FIG. 16 allows a low cost BM based adult device to be used to provide frictional engagement to a male penis, for example. The lubrication layer 1640 may be part of the adult device when purchased or alternatively applied to the adult device and/or penis prior to use such as by a spray or manually. After use the adult device can be simply disposed/thrown away due to its low cost. Optionally, the adult device may have a tapering BM body 1610 that narrows with distance offering engagement to varying sized objects. Beneficially, such a tapering as depicted in FIG. 16 allows a large number of adult devices 1650 to be stacked within a small space.

According to an embodiment of the invention adult device 1650 and/or BM body 1610 with or without foam as well as other designs described supra in respect of FIGS. 4, 7-15, and 17-20 may be sold as discrete elements without filling fluid or other filler material. In these embodiments the BM adult device may be sold through other age restricted channels of sale, e.g. tobacco and alcohol, rather than solely through adult stores.

Within embodiments of the invention the "empty" BM body may, as an alternative/option to the essentially blank opening depicted in FIG. 16 and the threaded opening depicted in many embodiments of the invention depicted FIGS. 4, 7-15, and 17-20, have a smooth shaped opening with increased thickness around the lip of the opening. Such a thicker lip region would provide for the option of the user adding a closing element to allow the BM body to be filled and then sealed. Such a closing element may, for example be a cork shaped tapering stopper or a parallel walled stopper which may provide sealing by wedging into, locking into, or being a compression fit with the BM body. Alternatively, the opening may be designed to receive snap fit lid or threaded cap. Optionally, a lid/cap may contain active electronics which produce and/or control the provisioning of at least one of an electrical, electromagnetic, vibration, temperature, texture, movement, and friction sensation to the user. Optionally, the lid/cap may also contain one or more sensors for internal use, controlling the device, and/or communications relating to said device to at least one of a remote controller, a PED, and the Internet, for example.

Figure 17:
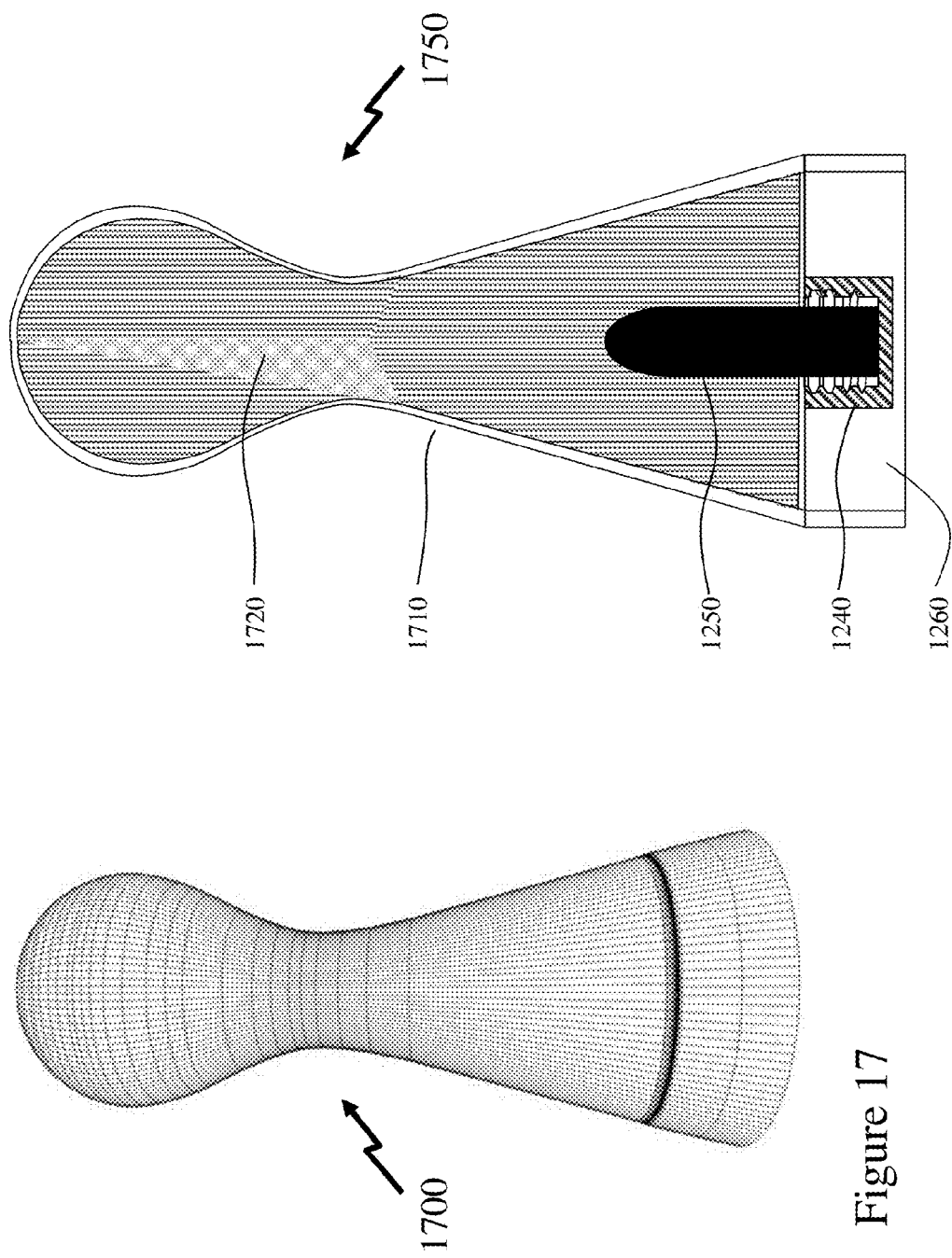
FIG. 17 depicts an adult device according to an embodiment of the invention.

Referring to FIG. 17 there is depicted an adult device in external view 1700 and cross-section 1750 according to an embodiment of the invention. As depicted the adult device comprises a blow molded (BM) body 1710 with a screw-thread. In this instance the BM body 1710 has been pre-filled with foam 1720, such as described supra in respect of FIG. 12A, wherein the BM body 1710 and foam 1720 have been designed/formed to fit onto a vibrator 1250 having at its end a threaded section matching the screw thread on the BM body 1710. Accordingly, a small compact vibrator 1250 may be turned into a large vibrating adult device through its placement within the cavity at the end of the BM body 1710. Again, a variety of BM bodies 1710 may be sold as disposable/consumable elements in conjunction with a vibrator 1250. Within the end of the BM body 1710 is a recess 1260 such that the threaded portion of the BM body 1710 does not project outside the base of the BM body 1710 allowing the BM body 1710 to stand unaided in either unassembled or assembled state. Accordingly, the BM body 1710 may appear when unassembled to be a plastic ornament but can be converted with ease by the user.

Optionally, in other embodiments of the invention the opening within the foam 1720 may be designed to fit one or more vibrators, including compact vibrator 1750. For example, a vibrator may, when implemented in technologies other than offset weights on a motor, resemble a pencil for example such that the opening within foam is a long narrow opening. In other embodiments of the invention the foam may fill the internal volume of the BM body 1710 and be compressed when the vibrator is initially inserted into the BM body 1710.

Now referring to FIG. 18A there is depicted an assembly configuration and assembled adult device according to an embodiment of the invention. Accordingly, the assembly consists of BM body 1820, cap 1830, and frame 1810 for use in conjunction with a vibrator 1840, such those commonly referred to as an egg or bullet. In use the user assembles the vibrator 1840 into the frame 1810 before inserting it into the BM body 1820 and screwing on the cap 1830. The result being assembled device 1850 wherein the vibrator 1840 is now at the bottom of the BM body 1820 held in position by the frame 1810 and retained through pressure applied by cap 1830 via the frame 1810 which is dimensioned appropriately relative to the length of the BM body 1820. The frame 1810 also by virtue of being in contact with the vibrator 1840 and BM body 1820 couples the mechanical vibrations of the vibrator 1840 to the user via the BM body 1820. Optionally, the design/dimensions of frame 1810 may be varied to suit a range of vibrators whilst within other embodiments the frame 1810 may be double ended so that one end suits one sub-set of vibrators and the other send a second sub-set of vibrators.

Figure 18B:
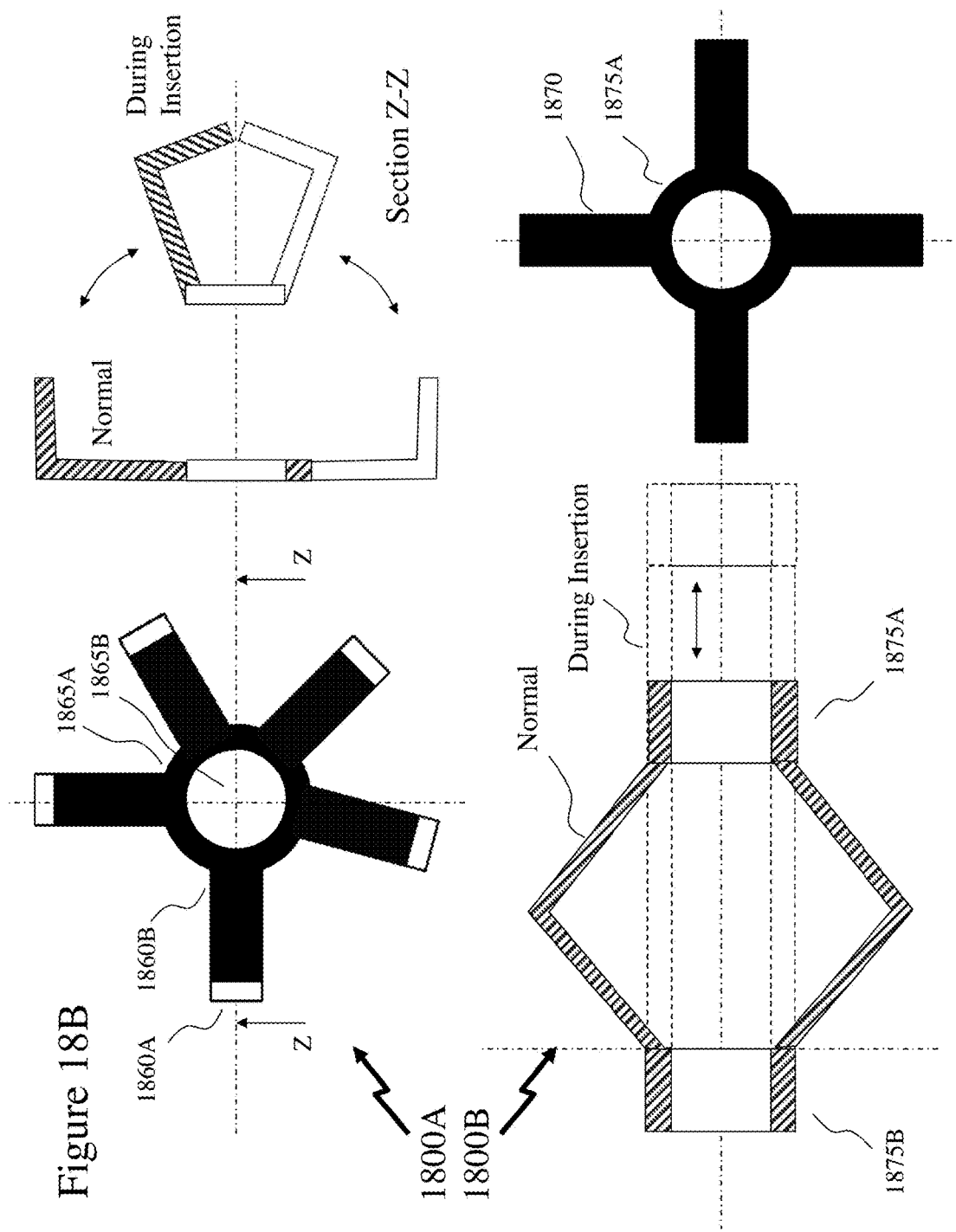
FIG. 18B to 18D depict assembly configurations and inserts for positioning a vibrating element within an adult device according to embodiments of the invention.

Now referring to FIGS. 18A and 18B there are depicted assembly configurations and inserts for positioning a vibrating element within an adult device according to embodiments of the invention. Referring to first and second elements 1800A and 1800B in FIG. 18 representing inserts for insertion into a BM body such as described supra in respect of embodiments of the invention in FIGS. 7 to 18A respectively and below in respect of FIGS. 19 and 20 respectively. As depicted first element 1800A comprises a plurality of arms 1806B terminating in tips 1860A attached to a central ring 1865A with opening 1865B. As depicted first element 1800A is one of range of designs for "flower-shaped" or "spider" inserts although it would be evident that other designs may be employed including those with varying design arms, varying tip designs, central ring, opening, thickness, etc. as well as choice of material for the fabrication of the insert. Within other embodiments of the invention the insert may alternatively be a solid disk with flat surface, contoured surface, convex surface, concave surface, etc.

Figure 18C:
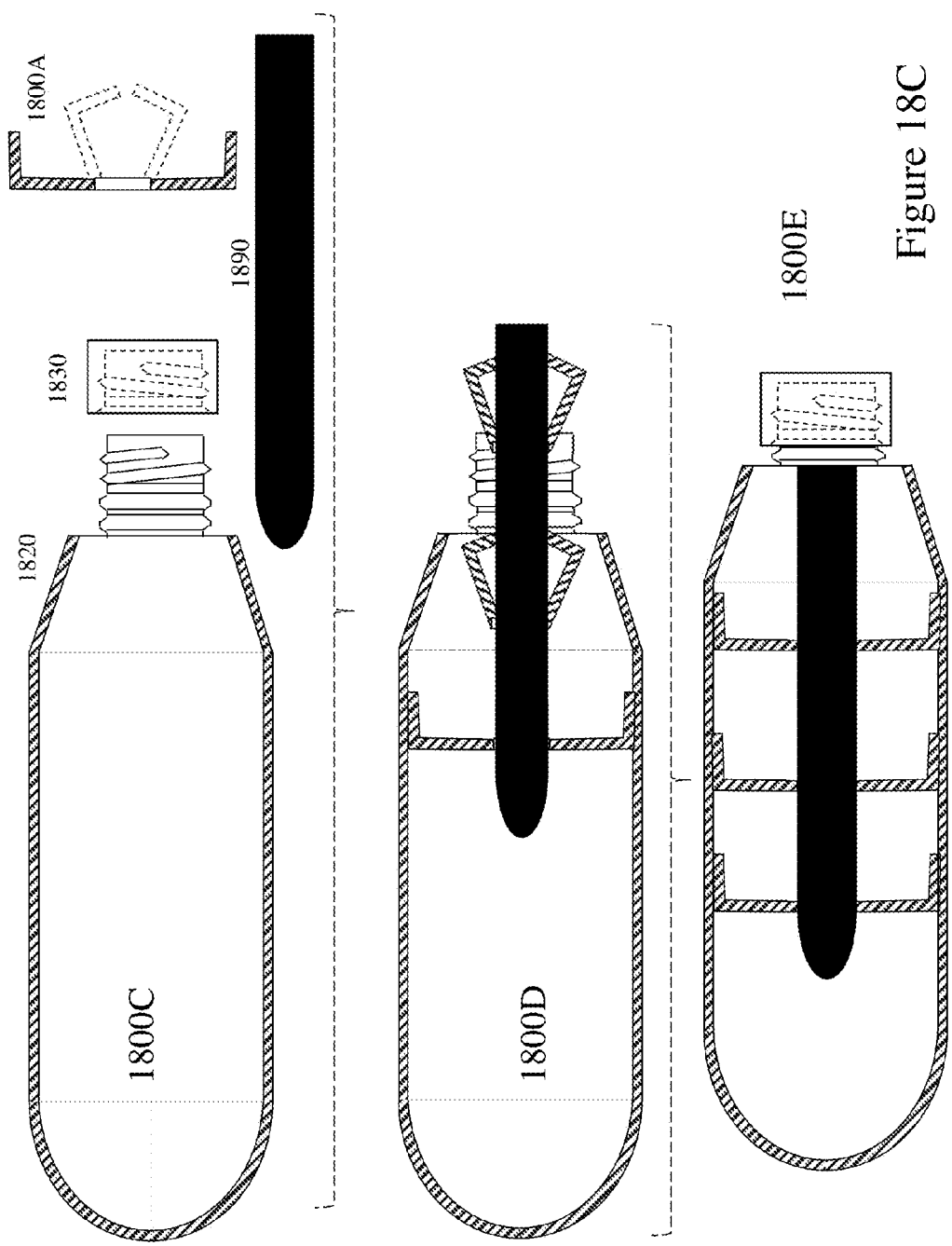

As depicted in normal and during insertion cross-sections for first element 1800A show that it folds-up/collapses to a smaller cross-section allowing it to be inserted within a BM body through an opening wherein it expands and contacts the wall of the BM body such that vibrations from a vibrator element fitted within the opening 1865B are coupled by the first element 1800A to the outer wall of the BM body, see FIG. 18C for example. In order to adjust the characteristics of the insert the arms/disk of the first element 1800A may be designed with thin sections so that the first element 1800A has natural weak places to fold as it is inserted into the BM body.

The first element 1800A may lock into place by springing open once inside the BM body such that the first element opens up to approximately ninety degrees and held between the vibrator element and the wall of the BM body. Optionally, the first element 1800A may jam tight after being pressed in over the center or just under center. In some embodiments of the invention the profile of the BM body walls may be such that the insert engages within a ridge or trough, for example. In contrast second insert 1800B whilst engaging and restraining a vibrating element within a BM body and communicating the vibrations to the wall of the BM body comprises multiple members 1870 attached to first and second ends 1875A and 1875B wherein the multiple members 1870 flatten for insertion and spring back open after insertion. In contrast to first element 1800A the second element 1800B can also provide retention and placement of the vibrator element relative to the distal end of the BM body from the opening within which it is inserted.

Now referring to FIG. 18C it can be seen in first to third assembly images 1800C to 1800E that a plurality of first inserts 1800A, e.g. 3, may be employed in a cascading fashion along the length of a vibrating element, e.g. bullet vibrator, to improve the coupling of the vibrations to the surface of the BM body and hence the surface of the adult device. Alternatively, multiple first elements 1800A may be formed as a single piece-part with connecting body elements or the number of first inserts 1800A may be varied according to the vibrating element, e.g. 3 for a bullet vibrator and 2 for an egg vibrator. Similarly, different geometries of the first element 1800A may be employed with a common vibrating element or different vibrating elements or a single first element 1800A may be designed with 'knock-outs" allowing the diameter of the opening 1865B to be varied by the user at deployment. In other embodiments of the invention a tool may be employed to push the insert "home" to recesses in the BM body wall which may be provided with the first inserts 1800A or BM body 1800B or be a common household object, e.g. chop stick, knitting needle etc. inserted through the opening within the BM body.

Figure 18D:
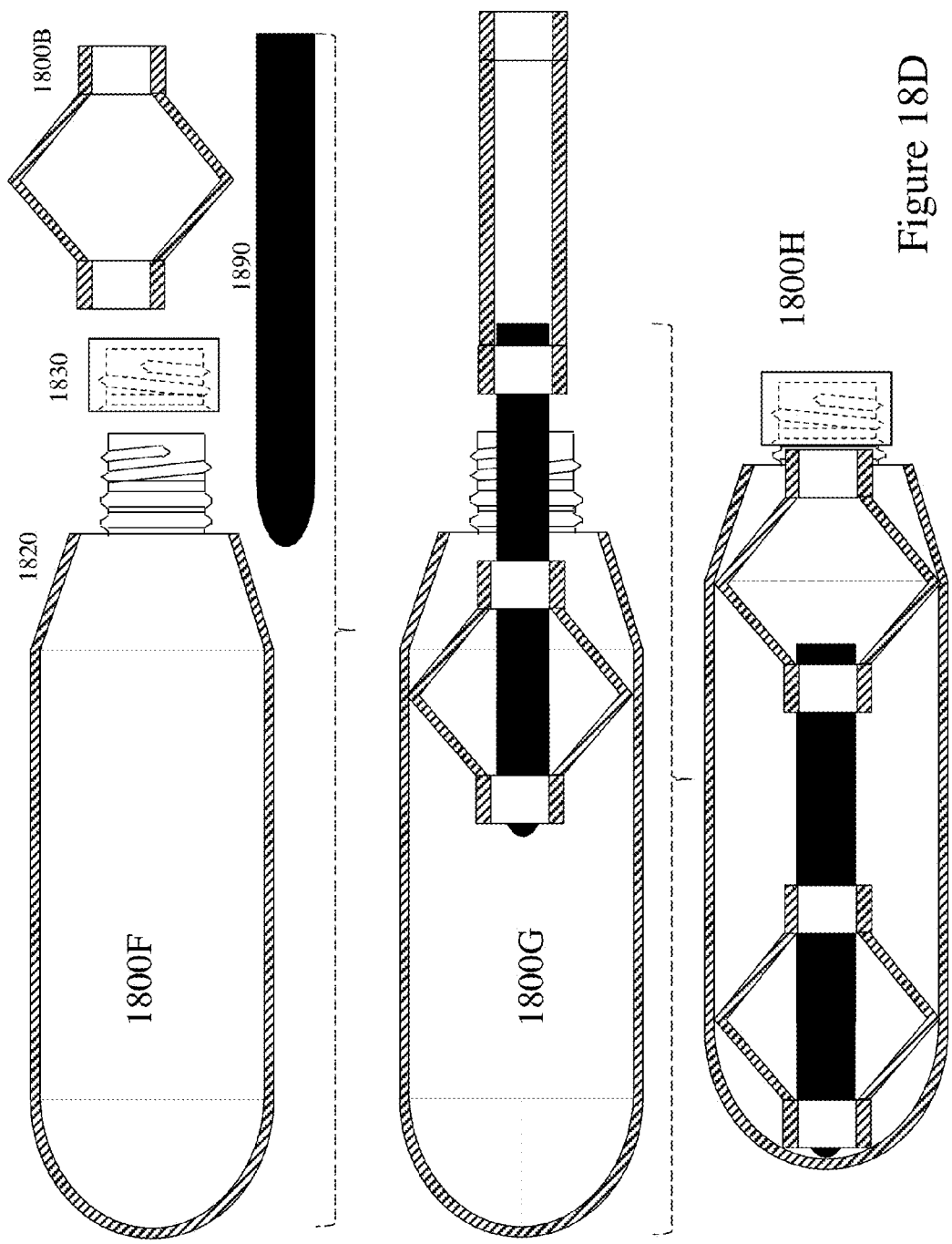

Now referring to FIG. 18D it can be seen in first to third assembly images 1800F to 1800H that a plurality of second inserts 1800B, e.g. 2, may be employed in a cascading fashion along the length of a vibrating element, e.g. bullet vibrator, to improve the coupling of the vibrations to the surface of the BM body and hence the surface of the adult device, whilst also positioning the vibrating element within the BM body. Accordingly, as depicted in FIGS. 18C and 18D low cost vibrators may be implemented using BM bodies in conjunction with retaining elements for a vibrating element.

Referring to FIG. 19 there is depicted an assembly configuration comprising concertina BM body 1920, cap 1910, and rod 1930. Accordingly, the user may select a rod 1930, e.g. a chop stick, branch, etc. or a purchased rod. The user then breaks, cuts, or trims as appropriate the rod 1930 to a desired length wherein by inserting the trimmed rod 1930 into the concertina BM body 1920, pushing it with the cap 1910 and then screwing the cap 1910 onto the concertina BM body 1920 he/she extends the concertina BM body 1920 to a desired length. Accordingly, depending upon the design of the concertina BM body 1920 and the way the user extends it then all sections may extend together or only some sections may be extended. It would be evident that the design approach of FIG. 19 may be combined with that of FIG. 18 to provide a low cost and/or disposable adult device design that supports user configuration for length and vibration. Similarly, merging one or more of these design concepts with a modular device concept such as depicted in FIG. 15 allows for user configuration of each end of a double-ended adult device.

Now referring to FIG. 20 there is depicted an assembly configuration comprising BM body 2020, cap 2030, and frame 2010. In use the user assembles the vibrator 2040 into the frame 2010 before inserting it into the BM body 2020 and screwing on the cap 2030. The result being assembled device 2050 wherein the vibrator 2040 is now at the top of the BM body 2020 held in position by the frame 2010 and retained through pressure applied by cap 2030. Accordingly, the vibration from the vibrator 2040 is coupled to the bulge 2025 and the shell of BM body 2020. In this embodiment the bulge 2025 may engage the clitoris whilst the BM body 2020 penetrates.

Figure 21:
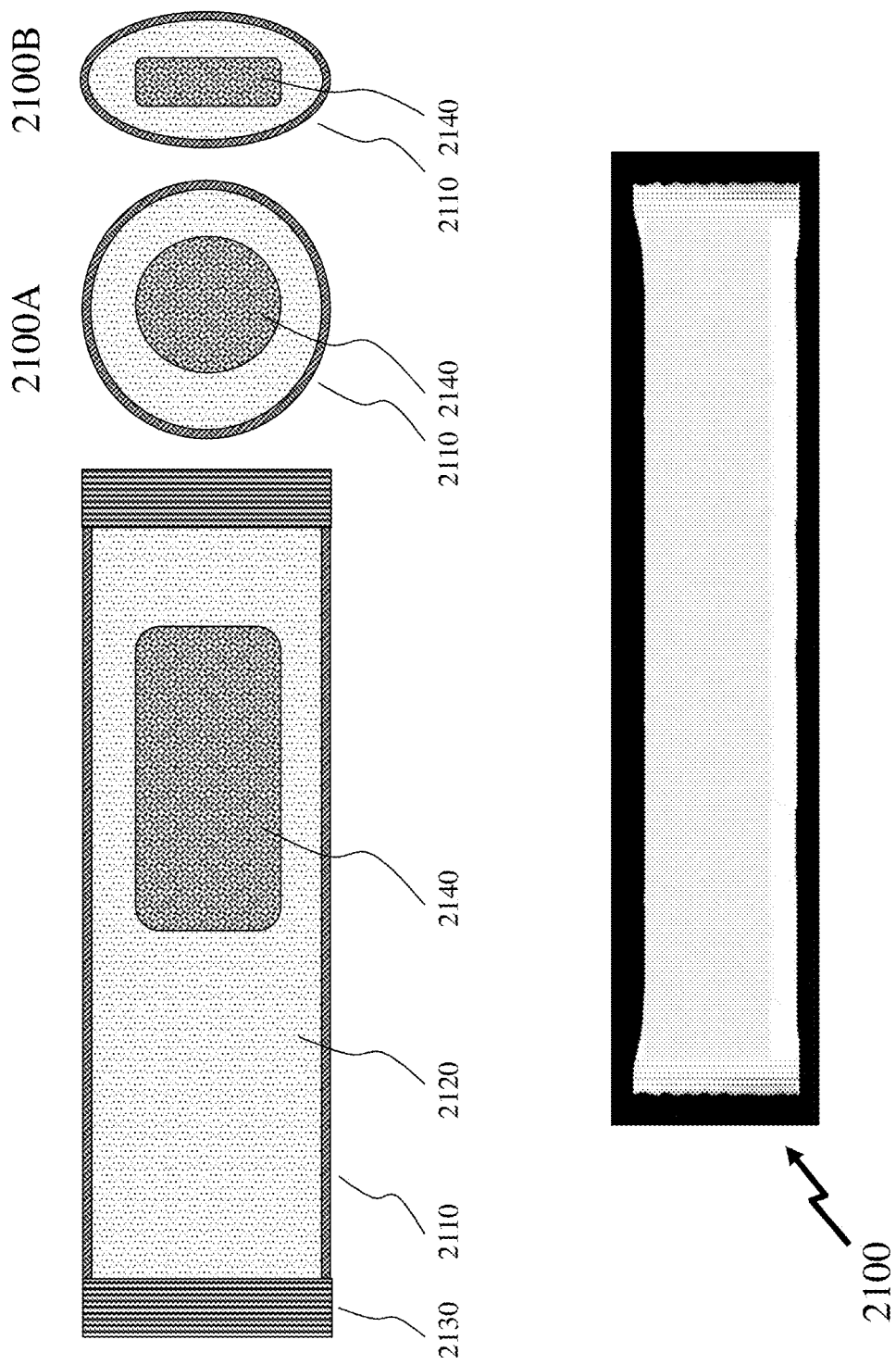
FIG. 21 depicts an adult device according to an embodiment of the invention.

Now referring to FIG. 21 depicts an adult device 2100 according to an embodiment of the invention exploiting an EBM body 2110 with crimped ends 2130. Within EBM body 2110 there is a vibrating element 2140 within filler 2120. As depicted in first and second cross-sections 2100A and 2100B respectively the adult device 2100 may be circular or elliptical in cross-section respectively, for example. The vibrating element 2140 may, for example, incorporate a battery or this may be separately disposed within the EBM body 2110. In some embodiments of the invention activation of the vibrating element 2140 may be through pressure and/or vibration/shock being applied to the adult device 2100. Optionally, the filler 2120 may be a fluid dispensed into the EBM body 2110 during manufacturing process that subsequently cures. Optionally, the filler 2120 may be frozen for using the adult device 2100 in order to couple the vibrations from the vibrating element 2140 to the wall of the EBM body 2110 and therein to the user. It would be evident that the outer surface of the EBM body 2110 may be printed/patterned in a manner similar to or mimicking other commercial products such as beauty products, yoghurt, etc.

Optionally, an adult device 2100 may also be sold and/or given away as what is known as a "freezie", also known as a freeze pop, ice-pole, icy-pole, or ice pop, which is typically a water-based frozen snack made by freezing flavored liquid such as sugar water, fruit juice or purée inside a plastic casing or tube, either round or flat. Accordingly, an adult device 2100 may be designed such that the EBM body 2110 is compressible enough to get the frozen or semi-frozen filling out to eat, but stiff enough, that when filled with a frozen or thawed liquid, including the original contents for example, it can be used as an adult toy. Optionally, the EBM body 2110 is thick enough that it may be left empty or in other embodiments of the invention it may be gas filled after consumption of its contents.

Optionally, within other embodiments of the invention the EBM body 2110 may have a snap fit lid, screw cap, plastic zippers (e.g. Ziploc), or fold over. As noted supra the EBM body 2110 and therein adult device 2100 may be sealed from the factory like a freezie which the user must tear open, but could still be used as a dildo, or the user can open it allowing the freezie shell, EBM body 2110, to subsequently receive a standard bullet vibrator available separately. Such designs may also exploit snap fit lids, screw caps, or plastic zippers for example.

Optionally, adult device 2100 may start as a balloon which is filled with a fluid, sealed such as by tying a knot within the material forming the opening to the balloon, and then frozen with or without a vibrating element disposed within. Optionally, the adult device 2100 exploiting a balloon construction may exploit additional elements such as described and depicted in respect of FIG. 23.

Figure 22:
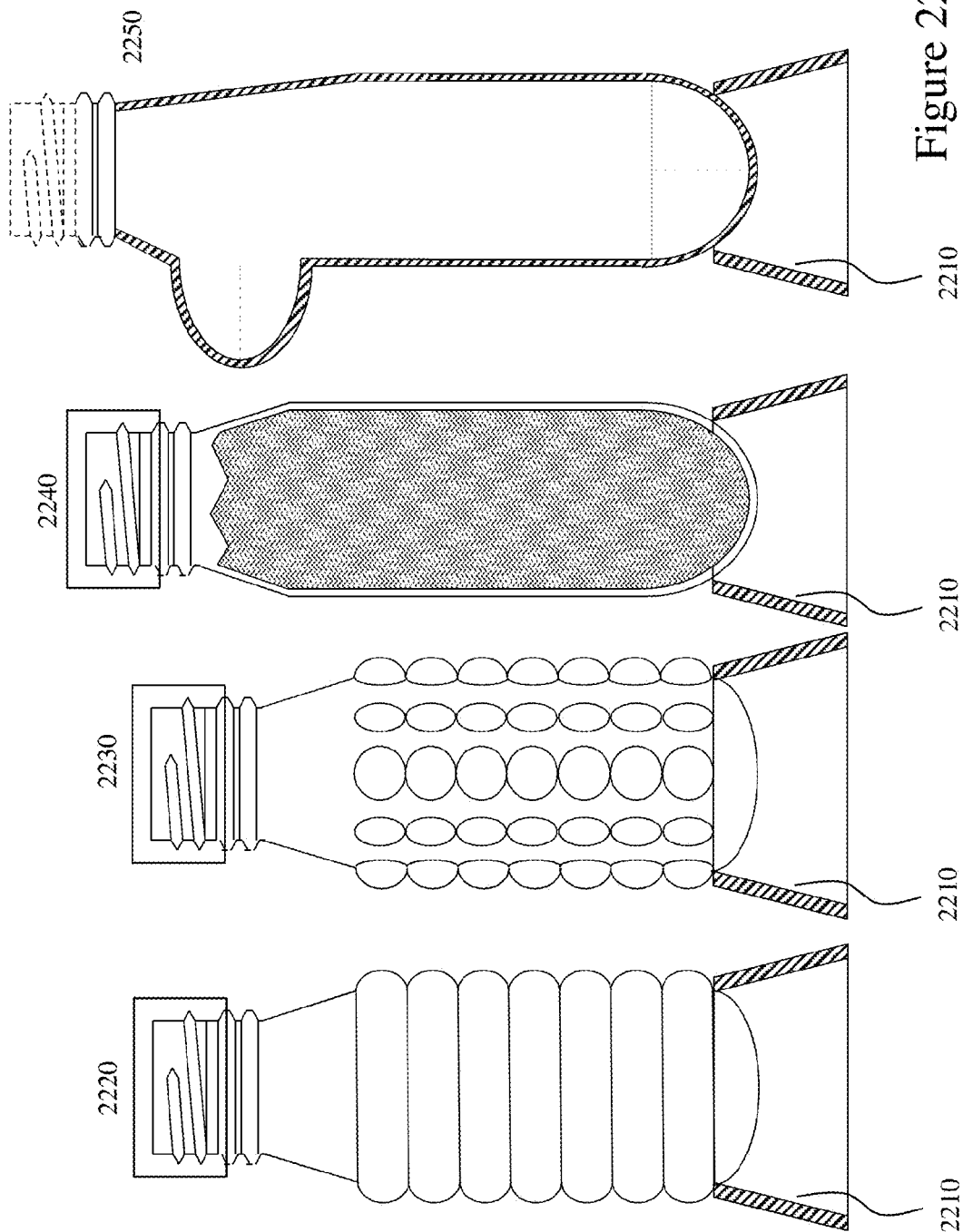
FIG. 22 depicts a base mounting for adult devices according to embodiments of the invention.

It would be evident that many embodiments of the invention, by providing BM bodies compatible with use as adult toys, have profiles at one end or both ends that are generally incompatible with the BM body self-supporting within a retail environment or the user's residence, for example. Accordingly, as depicted in FIG. 22 within the retail environment a base 2210 may be employed in conjunction with first to fourth BM bodies 2220 to 2250 respectively. The base 2210 may be provided as part of the purchased product wherein it is removed by the user prior to using the BM body as an adult device or alternatively it may be provided as part of the retail display, for example. Optionally, the base 2210 may be designed to support the adult devices, as depicted by first to fourth BM bodies 2220 to 2250 respectively at the distal end from penetration and/or use and at the end with a sealing mechanism, e.g. threaded caps.

Figure 23:
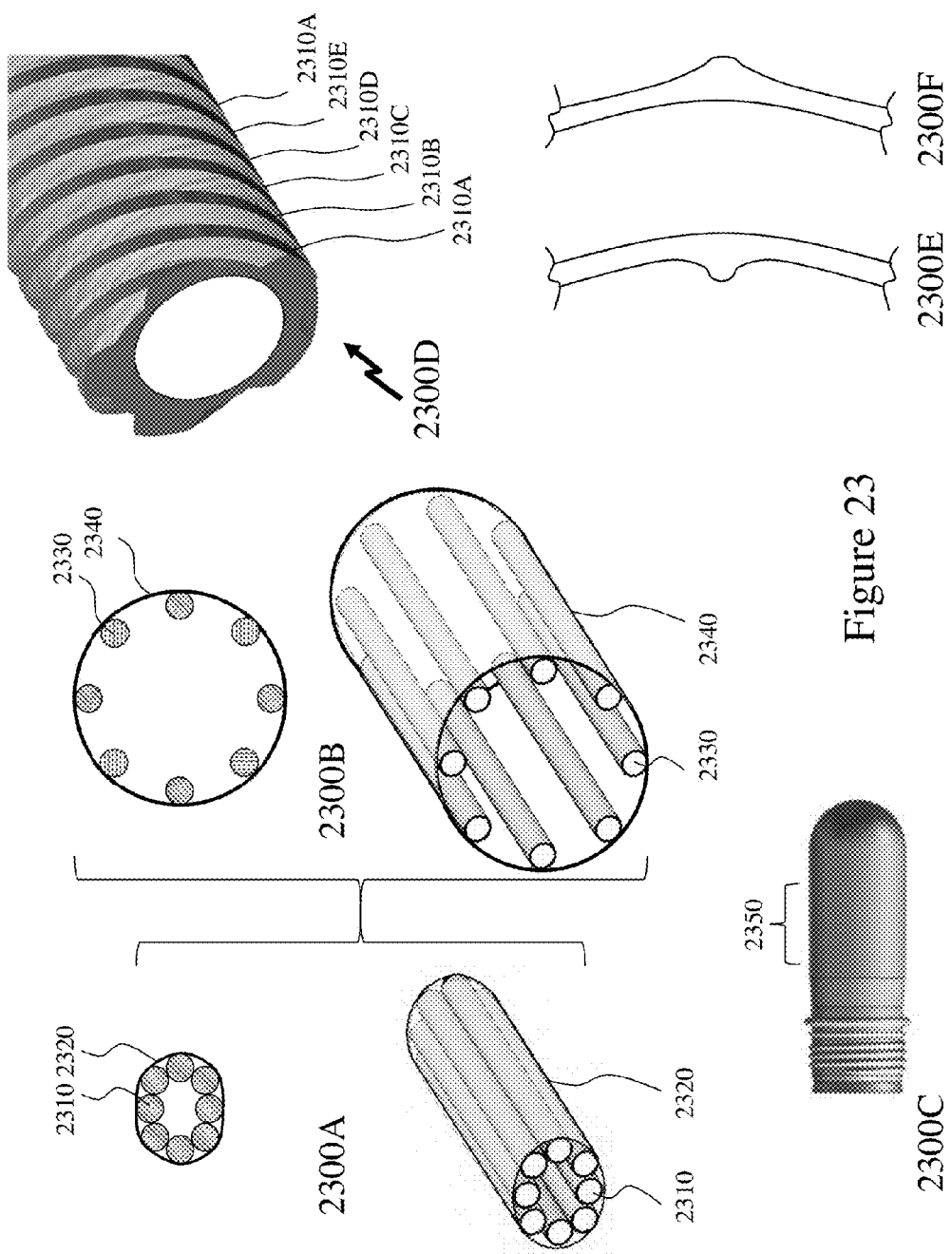
FIG. 23 depicts a blow molding methodology exploiting a non-uniform preform according to an embodiment of the invention to provide an adult device comprising a shell with "strengthening" ribs.

Now referring to FIG. 23 there is depicted a blow molding methodology exploiting a non-uniform preform according to an embodiment of the invention to provide an adult device comprising a shell with "strengthening" ribs. Referring to first structure 2300A a section of an initial preform comprising a plurality of "ribbed" regions 2310 are disposed on the inner surface of a shell 2320 is depicted prior to being blow molded. The first structure 2300A corresponding to region 2350 in preform 2300C. Subsequently, the first structure 2310 is blown leading to second structure 2300B wherein the expanded shell 2340 now has a number of ridges 2330 around the inner surface. Within first and second structures the "ribbed" regions 2310 and ridges 2330 are depicted as circular elements for ease of depiction. However, it would be evident that these may have a variety of initial "widths" and "thicknesses" which in combination with the blow molding lead to ridges of a predetermined final geometry. Accordingly, a thin shell 2340 has "strengthening" ribs 2330. Within first and second structures 2300A and 2300B the ribs 2310/ridges 2330 run longitudinally along the preform.

However, it would be evident that alternatively these may run around the surface radially as a series of rings along the length of the preform and thence blow molded part or alternatively that they may be spiraled in a similar manner to a multi-start thread such that the multiple spirals are interleaved relative to one another such as depicted in fourth structure 2300D wherein a five-start spiral is depicted with first to third spirals 2310A to 2310E respectively. Further as evident in fifth and sixth structures 2300E and 2300F wherein the "ridges" are formed on the outer and inner surfaces of the shell based upon the local thickness of the preform varying and the geometry of the mold in the two instances. Optionally, the material employed for the adult devices as depicted within FIG. 23 may be latex, rubber, or an elastic polymer such that when removed from the mold the second structure collapses to a smaller geometry but subsequently re-expands when the adult device is filled with a fluid. Alternatively, the polymer may be sufficiently thin when blown that the adult device may be "collapsed" such as by applying a negative pressure, external force, etc. to the structure which is then reversed by filling the "collapsed" adult device to its "expanded" form. In these instances the "ridges" and/or "ribs" engineered into the adult device provide added integrity and resilience to the structure when filled with the fluid. Optionally, embodiments of the invention as described within FIG. 23 may be considered to be balloons through the elastic nature of the shell within which are disposed rigid or semi-rigid structural elements.

Referring to FIG. 24 there are depicted blow molded adult device geometries according to embodiments of the invention similar to those described and depicted in respect of FIG. 4. Accordingly, a beverage container 2410 is depicted with threaded portion 2420 to which a sealing cap, not depicted, would be attached when the beverage container 2410 was purchased. In common with the designs in FIG. 4 in first configuration 2400A a vibrator 2440 can be attached to the beverage container 2410 but it's threaded section 2430 is designed to place the vibrator 2440 outside the beverage container 2410 such that now a compact vibrator 2440 can be held and/or manipulated in a manner or manners common to larger dedicated adult devices either against or within regions of the user's anatomy or another user's anatomy by the user.

Now referring to second configuration 2400B then there is similarly depicted a beverage container 2410 is depicted with threaded portion 2420 to which a sealing cap, not depicted, would be attached when the beverage container 2410 was purchased. In common with the designs in FIG. 4 in first configuration 2400A a vibrator 2440 can be attached to the beverage container 2440 but now it has first and second threaded sections 2430 and 2450 which are designed to place the vibrator 2440 outside and inside the beverage container 2410 respectively. Accordingly, in common with first structure 2400A use of first threaded section 2430 places the vibrator 2440 outside the beverage container 2410 and then, in common with FIG. 4, the use of second threaded section 2450 places the vibrator 2440 within the beverage container 2410.

Optionally, embodiments of the invention may be provided as a collapsible insert inside a BL body, e.g. bottle, so it can be tossed or recycled or could receive a standard screw cap, snap fit etc. compatible bullet. Optionally, the insert could be part of the BM body itself, molded inside as a pre- or over-mold or one step operation. Optionally, a bullet vibrator insert may include an optical source, e.g. LED(s), for clear and coloured BM/EBM bodies of adult devices.

Optionally, bullet vibrators or other vibrators compatible with use with BM/EBM bodies according to the embodiments of the invention may combine other technologies discretely or in combination to provide user stimulation. Such technologies may provide electrical stimulation, electromagnetic stimulation (e.g. infrared heat for example), vibration, temperature (heating or cooling for example), variable texture, adult device movement, adult device dimensional variations and/or geometry variations, and friction. Active elements, including bullet vibrators and vibrators, may further include control interfaces, interfaces to remote controls, sensors, etc. Optionally, multiple small active elements, e.g. bullets or balls, may be employed wherein varying combinations provide varying effects to the user and/or the active elements adjust/vary their function in dependence upon identifying other locally associated devices etc. For example, a user may employ three active elements to provide vibration, heat, and visual stimuli. Further, such non-traditional geometries may allow disguise etc. of the active elements. As the active elements are now within an outer shell their geometry is now not defined by providing smooth surfaces for ease of penetration etc. Accordingly, active elements may be cubic, spherical, elliptical, polygonal, etc. and may stack, interlock, etc. Equally a user may employ a varying number of vibratory elements according to mood, activity, etc. Similarly, such active elements may be used with other adult device elements formed by manufacturing processes other than the blow molding techniques described supra in respect of embodiments of the invention.

Within the embodiments of the invention discussed supra the blow molded (BM) body may be clear, white, black, coloured, transparent, tinted, etc. according to demographics, marketing, etc. Once the adult device has been blow molded then it is possible to spray colour and other additives onto the BM part(s) although this may prove risky or difficult. Typically the BM parts should be flamed in order to get improved adhesion of the coating which with the intended use of adult devices there is potential for the coating to delaminate during use or washing. Regarding washing, only PP and PC are dishwasher safe. Other BM materials should be hand-washed in warm water.

Within the embodiments of the invention described supra in respect of FIGS. 7 to 21 the opening of the body of the adult device has been primarily considered as having a threaded opening, although FIG. 21 does exploit crimped seals. However, it would be evident to one skilled in the art that other designs of re-sealable opening including, but not limited, to screw caps, cork stoppers, glass stoppers, snap on closures that fit onto lugs/rims on the top of the opening, recloseable clasps, sports caps that can be removed and replaced, friction fitting tops, and interference fitting tops.

Adult devices may be manufactured clear with PETG, co-polyester, or PVC allowing compatibility with dual uses such as initial sale and distribution as a consumable item and then subsequent use as an adult device. Alternatively, devices may be slightly opaque (i.e. milky), or fully coloured. It is also possible to manufacture BM parts with coloured stripes in the vertical direction.

As noted supra some embodiments of the invention have foam filling the BM body part(s). Whilst today no machines are known by the inventors to exist that automatically add foam to blow molded parts machines for forming-filling-sealing are known wherein the blow molded parts are filled with a liquid and crimped to avoid contamination. With some "foams" these may be dispensed as liquids that foam and harden once dispensed.

Within embodiments of the invention exploiting blow molding processes that have a phallic shape and/or a protrusion of some form it will be common for a flash line to form along the axis where the protruding part(s) extend from. Such an artifact is common, for example, to EBM bottles and all parts will have it at the opposite end of the neck. Removal of such flash lines may be undertaken using flaming, typically manually. However, EBM molds open along the vertical axis and undercuts within the vertical direction are possible allowing such flash lines to be eliminated along the major axis of an adult device.

In respect of some forms of adult device such considerations adjust manufacturing/design methodologies. For example, for clitoral vibrators so that a parting line avoids any undercuts these may be blown upside down so that the opening allows room for a battery pack in a blow molded vibrator or insertion of a vibrator as depicted in embodiments of the invention supra. Considering other adult devices then:

Rabbit Vibrators: essentially same as clitoral vibrator but would typically be one piece, rather than two;
Realistic Vibrators: wherein a primary issue is the design of undercuts;
G Spot Vibrators: as with clitoral vibrators but wherein the neck needs to be wide enough to allow insertion of the egg vibrator/bullet vibrator etc. as described in embodiments of the invention;
Traditional Vibrators: represent a relatively straight-forward design for blow molding with access through neck for electronics/battery insertion for example;
Bullet Vibrators: wherein for tapered designs these would need to be molded with a neck protruding out that can be capped off and used to insert any parts;
Anal Vibrators: essentially the same where even dual pleasure ones can be made in one piece;
Dildos: essentially same but with more design freedom as there is no opening for batteries/control circuit etc.;
Anal Toys: essentially same, wherein tapered designs, different size beads etc. could be easily incorporated;
Nipple Toys: wherein elements may be blow molded;
Male Masturbators: provide difficult design issues but soft foam filling may be employed to form the internal surface; and
Prostate Toys: may be blow molded by appropriate design changes.

Within embodiments of the invention described supra in respect of FIGS. 3 to 20 and the specification adult devices have been described exploiting blow molded bodies and/or piece parts. In order to blow mold one requires a mold. Correct mold design is important for the success of extrusion blow molding. Extrusion blow molds can be either machined or cast, as both processes produce similar physical characteristics. The ability of the cavity to conduct heat from the part is important. Extrusion blow molds can be made from cast aluminum, machined solid aluminum, or other good heat conducting alloys, such as copper bronzes.

Cast aluminum molds require that a model be built and are often useful when a representation of the product is needed before the start of major mold construction. Cut or machined molds can be made from computer aided design (CAD) models and do not require the use of a physical model. The choice between cast and cut is generally based on performance needs. Cast aluminum molds are a little softer and less durable than the equivalent cut aluminum/alloy molds. For products with very low annual usage requirements or very large parts, a cast mold is often the best option. Cut or machined molds are typically more robust and can be modified more easily than a cast mold.

Material grades for casting are typically unique to individual foundries but common grades of aluminum include 6061 and 7075. While ferrous and copper alloys are usually not cast for the body of the mold, steel and copper alloys can be inserted as pinch edges to improve a cast aluminum mold's durability. With machined molds aluminum is the material of choice and 6061-T6 or 7075-T6 grades of aluminum are commonly used. For molds that may see rigorous use or require durable pinch-off, a harder material can be substituted or inserted. Materials commonly used for this purpose include copper alloys or P-20 tool steel. Proper maintenance of ferrous alloys is required to avoid damage by oxidation.

For untextured molds a sandblasted finish is typically applied. For aluminum molds, the use of a coarse grade of silica sand is adequate. A sandblasted finish is coarse enough to create surface venting, but not deep enough to texturize the surface of the BM adult device. If a textured surface is desired, then coarser and deeper patterns within the mold are reproduced during the BM process.

BM molds can also accommodate inserts but in order to do so require receptacles to hold and allow the insert to release during part ejection. Inserts placed in a blow mold should allow the blown part to release on removal from the mold. If this is not possible, a pneumatic slide mechanism may be used. Venting around the insert is generally necessary to ensure consistent encapsulation. Inserts should be securely placed while the mold is closing. Typical inserts may include, mounting tabs, nuts, bolts, ports and tubes. These can be added to a part by placing an insert into the mold and blowing a parison around it. Attachment to the part can be accomplished through mechanical, adhesive or thermal weld. For mechanical attachment, inserts need a large base with a design that allows for parison encapsulation are one option.

In some embodiments of the invention it may be appropriate to provide a visual effect to the adult device. In some instances, this may be to give a surface the appearance of another material, e.g. leather, wood, stipple, sand, etc. In other instances it may be employed to give parts a more even, planned effect, or to get rid of a glossy appearance and change it to a matte finish. This can add richness to a parts appearance, therefore making the adult device more marketable, giving it a perception of higher value and quality, or making its appearance match a product that the adult device is seeking to masquerade as or initially be sold as. Surface finish may be also employed for other reasons, including, but not limited to:

include a company's logo or a pattern into the appearance of the part;
to diffuse light on clear parts, such as serrations or frosting;
make clear parts appear translucent;
for visual contrast; —through the use of two different textures on one part or by frosting;

hiding splay lines, flow lines, knit lines, blush marks, and other molding flaws;

add part numbers, designs, instructions for consumers, etc.;

eliminating secondary processes such as hot stamping or label application; and improve tactile sensations.

Within devices according to embodiments of the invention the fluid within the device can be heated or cooled prior to filling the device in order to provide additional sensations to the user during their use of the device. Optionally, by varying the thermal conductivity of the body of the device in different regions and/or by varying the thickness of the external device body etc. between the fluid and user's skin the degree of hot or cold applied to the user's skin can be varied across the surface of the device. In other embodiments dual fluidic chambers may, optionally, provide hot and cold within the same device.

In terms of materials for the fabrication of the device a variety of plastic materials can be employed as described supra in respect of the blow molded elements of an adult device in conjunction with the fluids and/or foam for filling the internal volume of the body. However, it would be evident that other materials may also be employed including, but not limited to, closed-cell foam, open-celled foam, polystyrene, expanded polystyrene, extruded polystyrene foam, polyurethane foam, phenolic foams, rubber, latex, jelly-rubber, silicone rubber, elastomers, stainless steel, Cyberskin and glass. Within embodiments of the invention the fluid may be a sexual lubricant or a household item, e.g. water, vegetable oil, mineral oil, or even beverage such as milk, juice, carbonated drink etc. In this manner a simple BM body with cap may be filled to form a solid dildo. The BM body may even be sourced initially in a manner appearing to be a consumable item for a household. Optionally, the BM body may be filled with a powder and/or paste such as flour, sugar, etc. Optionally, the BM body may be filled with a building material such as silicone sealant (which will cure), sand, etc. Alternatively, the filling material within an adult device according to an embodiment of the invention may be a food, a beverage, a cleaning product, a lubricant, and a beauty product. In embodiments of the invention the user may therefore fill an empty BM body with any suitable material to provide the desired characteristics. Alternatively, an empty BM body may be filled/pressurized with a gas, e.g. air, from a small hand pump or other pump, e.g. bicycle tire pump.

Optionally, in some embodiments of the invention the BM body may be inserted within a sheath such as one formed from an elastic material examples of which include rubber, latex, silicone rubber and an elastomer. Such a sheath may be a condom or prophylactic in order to provide lubrication, additional chemical induced sensations, and physical sensations through the geometry and profile of the surface of the prophylactic. In some embodiments of the invention the sheath may be permanently applied to the outer surface of the BM body through one or more manufacturing processes including, but not limited to, dip-coating, spray coating, and molding. It would also be evident that a single BM body may be formed through manufacturing within a single process step a single piece-part. Alternatively multiple discrete BM bodies may be coupled together directly or via intermediate tubing through processes such as thermal bonding, ultrasonic bonding, mechanical features, adhesives, etc. Alternatively multiple discrete BM bodies may be coupled together by the user in order to provide a range of adult devices from a single "kit" of parts. Accordingly, a single vibrator may be inserted into different BM bodies as depicted in FIG. 15 discretely or through combination with expander elements.

Whilst emphasis has been made to self-contained discrete devices it would be evident that according to other embodiments of the invention that the device can be separated into multiple units, such as for example a vibrator element coupled to an inserted BM body via a flexible BM tube in order to either keep the vibrator element external to the user's body or as part of a flexible portion of the body allowing user adjustment such as arc of a vaginal penetrative portion of a device. Optionally, it would also be evident that devices according to embodiments of the invention can be configured to be held during use; fitted to a harness; fitted via an attachment to a part of the user's body or another user's body, e.g., hand, thigh, or foot; or fitted via a suction cup or other mounting means to a physical object such as a wall, floor, or table.

Within embodiments of the invention with respect to devices and the electronic control the descriptions supra in respect of the Figures have described electrical power for vibrator elements as being derived from batteries, either standard replaceable (consumable) designs such as alkaline, zinc-carbon, and lithium iron sulphide ($LiFeS_2$) types, or rechargeable designs such as nickel cadmium (NiCd or Nicad), nickel zinc, and nickel-metal hydride (NiMH). Typically, such batteries are AAA or AA although other battery formats including, but not limited to, C, D, and PP3. Accordingly, such devices would be self-contained with electrical power source, controller, and remote interface which may be pump(s), valve(s) and actuator(s) all formed within the same body. It would be evident that fluidic pumps, electronic controller, and fluidic valves are preferably low power, high efficiency designs when considering battery driven operation although electrical main connections can ease such design limits. In instances of wired interface remote controls and electrical mains connections then the cap may be fitted with an opening allowing the screw cap to be attached with the cable in a slot with rubber/elastomeric grommet/edge etc. in order to reduce fluid leakage in such instances.

However, alternate embodiments of devices can be configured in so-called wand type constructions, see for example Hitachi Magic Wand within the prior art for example, wherein increased dimensions are typical but additionally the device includes a power cord and is powered directly from the electrical mains via a transformer. Optionally, a device can be configured with battery and electrical mains connections via a small electrical connector with a cord to a remote transformer and therein a power plug. Within embodiments of the invention to devices and the electronic control the descriptions supra in respect of the Figures the electrical control has been described as being within the device. However, optionally the controller can be remote to the device either connected via an electrical cable or communicating via an indirect means such as wireless communications for example. Additionally, the electronic controller has been primarily described as providing control signals to the active element(s), of the device. However, in some embodiments of the invention the electronic controller can receive inputs from sensors embedded within the device or external to the device. For example, a sensor can provide an output in dependence upon pressure applied to that portion of the device by the user, for example from vaginal contractions or a hand squeeze, wherein the controller can adjust one or more aspects of the device.

Specific details are given in the above description to provide a thorough understanding of the embodiments.

However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments can be described as a process, which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The foregoing disclosure of the embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A sexual stimulation device comprising:
  a threaded portion for mating to a molded outer body enclosing a predetermined region with a threaded opening allowing the predetermined region to be filled with a fluid and reversibly sealed via the threaded portion once the device is attached to the molded outer body;
  a body portion for insertion into the molded outer body and retained in position within the molded outer body by the threaded portion when the threaded portion is attached to the molded outer body; and
  a second molded outer body enclosing a second predetermined region with a threaded opening allowing the second predetermined region to be filled with a second fluid and reversibly sealed;
  a vibrator element forming a predetermined portion of the body portion; and
  an additional threaded region of the threaded portion for mating the second molded outer body to the threaded portion; wherein
  when the body portion is inserted into the molded outer body the second molded outer body provides at least one of:
    a handle;
    a second vibrating portion of the device together with the molded outer body for imparting mechanical vibration to a predetermined region of a human body; and
    a second vibrating portion of the device together with the molded outer body for imparting mechanical vibration to a predetermined region of a user whilst the molded outer body imparts mechanical vibration to a predetermined region of another user.

2. The sexual stimulation device according to claim 1, wherein
  the body portion comprises an opening dimensioned to allow insertion of a vibrator element and is dimensioned to establish mechanical contact between the body portion and the threaded portion at one end and between the body portion and a predetermined location of an inner wall of the molded outer body when the body portion is inserted into the molded outer body and the threaded portion is attached to the molded outer body.

3. The sexual stimulation device according to claim 1, wherein
  the molded outer body is a predetermined commercial product initially sold with a threaded cap sealing the molded outer body which is replaced with the threaded portion for re-sealing the molded outer body once the body portion is inserted into the opening, the threaded portion mating to the body portion and retaining the body portion in a predetermined position within the molded outer body.

4. The device according to claim 1, wherein
  the body portion is attached to the threaded portion and dimensioned to hold the vibrator element inserted into the molded outer body at a distal end of the molded outer body from the opening.

5. The device according to claim 1, wherein
  the body portion is dimensioned to hold the vibrator element inserted into the molded outer body at a distal end of the molded outer body from the opening such that the predetermined region can be filled with a foam with the vibrator element inserted and then the molded outer body sealed with the threaded portion.

6. The device according to claim 1, wherein
  the body portion is dimensioned in dependence upon the vibrator element allowing the predetermined region of the molded outer body to be filled with a foam with the body portion inserted into the molded outer body, the body portion removed, and the vibrator element to be inserted and retained in position by the threaded portion.

7. The device according to claim 1, wherein
  the body portion includes the vibrator element; and
  the user can use the device to impart mechanical vibration to a predetermined region of their body or another person's body individually or in combination with the molded outer body when the device is inserted and retained in position via the threaded portion.

8. The device according to claim 1, wherein
the body portion includes the vibrator element; and
an outer geometry of the threaded portion is the same as an outer geometry of the molded outer body at the threaded opening.

9. The device according to claim 1, wherein
the body portion is one of a plurality of body portions, each body portion comprising an inner portion defining an opening dimensioned to fit the vibrator element and an outer portion comprising a series of radial elements; wherein
each body portion has a deployed configuration defining a mechanical ring engaging an internal geometry of the molded outer body and is deformable to a second configuration allowing the body portion to be inserted through an opening within the molded outer body when mounted to the vibrator element; and
each body portion imparts mechanical vibration to the molded outer body from the vibrator element in the deployed configuration.

10. The device according to claim 1, wherein
the body portion is one of a plurality of body portions, each body portion comprising first and second portions defining an opening dimensioned to fit the vibrator element and a third portion between the first and second portions; wherein
each body portion has a first mode wherein the third portion fits through an opening within the molded outer body allowing it to be inserted within the molded outer body and a second mode wherein the third portion expands to engage an internal geometry of the molded outer body;
in the second mode a spacing between the first and second portions along the vibrator element is less than in the first mode; and
each body portion imparts mechanical vibration to the molded outer body from the vibrator element in the second mode.

11. The device according to claim 1, further comprising
the molded outer body with the threaded opening having a curved external geometry at an end distal to the threaded opening; and
a base which is attached to the molded outer body allowing the molded outer body to be stood initially upon a flat surface but detachable from the molded outer body such that in a first configuration the molded outer body may be employed as a dildo and in a second configuration may be employed as a vibrator when the body portion of the device incorporates or is coupled to the vibrator element.

12. The device according to claim 1, wherein
the threaded portion further comprises a second thread for mating to the threaded opening of the molded outer body; wherein
when the second thread is attached to the threaded opening, the body portion now extends away from the molded outer body.

13. The device according to claim 12, wherein
the body portion further comprises the vibrator element such that in a first configuration the vibrator element is inserted into the molded outer body and imparts mechanical vibration to the user via the molded outer body and in a second configuration the vibrator element is external to the molded outer body and imparts mechanical vibration to a user directly.

14. A sexual stimulation device comprising:
a threaded portion for mating to a molded outer body enclosing a predetermined region with a threaded opening allowing the predetermined region to be filled with a fluid and reversibly sealed via the threaded portion once the device is attached to the molded outer body;
a body portion for insertion into the molded outer body and retained in position within the molded outer body by the threaded portion when the threaded portion is attached to the molded outer body;
a second molded outer body enclosing a second predetermined region with threaded openings at distal ends allowing the second predetermined region to be filled with a second fluid and reversibly sealed;
a vibrator element forming a predetermined portion of the body portion; and
a threaded element for mating the second molded outer body to the molded outer body; wherein
the body portion is inserted into an end of the second molded outer body to which the molded outer body is attached via the threaded element;
the vibrator element is retained by the threaded portion of the device; and
the molded outer body and the second molded outer body impart mechanical vibration to a user either externally or with increased penetration into an orifice of the user than the molded outer body alone.

15. A sexual stimulation device comprising:
a threaded portion for mating to a molded outer body enclosing a predetermined region with a threaded opening allowing the predetermined region to be filled with a fluid and reversibly sealed via the threaded portion once the device is attached to the molded outer body; and
a body portion for insertion into the molded outer body and retained in position within the molded outer body by the threaded portion when the threaded portion is attached to the molded outer body; wherein
the body portion is one of a plurality of body portions, each body portion comprising an inner portion defining an opening dimensioned to fit a vibrator element and an outer portion comprising a series of radial elements;
each body portion has a deployed configuration defining a mechanical ring engaging an internal geometry of the molded outer body and is deformable to a second configuration allowing the body portion to be inserted through an opening within the molded outer body when mounted to the vibrator element; and
each body portion imparts mechanical vibration to the molded outer body from the vibrator element in the deployed configuration.

16. A sexual stimulation device comprising:
a threaded portion for mating to a molded outer body enclosing a predetermined region with a threaded opening allowing the predetermined region to be filled with a fluid and reversibly sealed via the threaded portion once the device is attached to the molded outer body; and
a body portion for insertion into the molded outer body and retained in position within the molded outer body by the threaded portion when the threaded portion is attached to the molded outer body; wherein
the body portion is one of a plurality of body portions, each body portion comprising first and second portions defining an opening dimensioned to fit a vibrator element and a third portion between the first and second portions;

each body portion has a first mode wherein the third portion fits through an opening within the molded outer body allowing it to be inserted within the molded outer body and a second mode wherein the third portion expands to engage an internal geometry of the molded outer body;

in the second mode a spacing between the first and second portions along the vibrator element is less than in the first mode; and each body portion imparts mechanical vibration to the molded outer body from the vibrator element in the second mode.

17. A sexual stimulation device comprising:

a threaded portion for mating to a molded outer body enclosing a predetermined region with a threaded opening allowing the predetermined region to be filled with a fluid and reversibly sealed via the threaded portion once the device is attached to the molded outer body; and a body portion retained in position by the threaded portion when the threaded portion is attached to the molded outer body; wherein the threaded portion comprises a first thread for mating to the threaded opening of the molded outer body such that when the first thread is attached to the threaded opening the body portion is inserted into the molded outer body; and the threaded portion further comprises a second thread for mating to the threaded opening of the molded outer body such that when the second thread is attached to the threaded opening, the body portion extends away from the molded outer body.

18. The device according to claim 17, wherein the body portion further comprises a vibrator element such that when the first thread is attached to the threaded opening the vibrator element is inserted into the molded outer body and imparts mechanical vibration to a user via the molded outer body and when the second thread is attached to the threaded opening the vibrator element is external to the molded outer body and imparts mechanical vibration to a user directly.

* * * * *